US012569795B2

(12) United States Patent
    Jo et al.

(10) Patent No.: US 12,569,795 B2
(45) Date of Patent: Mar. 10, 2026

(54) METHOD AND ELECTRONIC DEVICE FOR DETECTING CONTAMINATION OF FILTER

(71) Applicant: Samsung Electronics Co., Ltd., Suwon-si (KR)

(72) Inventors: Hyukbin Jo, Suwon-si (KR); Eunjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/371,118

(22) Filed: Sep. 21, 2023

(65) Prior Publication Data

US 2024/0100458 A1 Mar. 28, 2024

Related U.S. Application Data

(63) Continuation of application No. PCT/KR2023/014196, filed on Sep. 19, 2023.

(30) Foreign Application Priority Data

Sep. 28, 2022 (KR) ........................ 10-2022-0123477

(51) Int. Cl.
    B01D 46/00 (2022.01)
    F24F 11/39 (2018.01)
(52) U.S. Cl.
    CPC .......... B01D 46/0086 (2013.01); F24F 11/39 (2018.01); B01D 2273/18 (2013.01)
(58) Field of Classification Search
    None
    See application file for complete search history.

(56) References Cited

U.S. PATENT DOCUMENTS

| | | | |
|---|---|---|---|
| 8,182,579 B2 | 5/2012 | Woo et al. | |
| 11,371,742 B2 | 6/2022 | Chu et al. | |
| 2010/0001677 A1 | 1/2010 | Woo et al. | |

FOREIGN PATENT DOCUMENTS

| | | |
|---|---|---|
| CN | 101618286 A | 1/2010 |
| JP | 10-309422 | 11/1998 |
| JP | 2000-325720 | 11/2000 |
| JP | 2001-149728 | 6/2001 |
| JP | 5287620 | 9/2013 |
| KR | 10-2003-0086739 | 11/2003 |
| KR | 10-0721458 | 5/2007 |

(Continued)

OTHER PUBLICATIONS

KR20100004044A_Eng (Expacenet machine translation of Woo) (Year: 2010).*

(Continued)

*Primary Examiner* — Gabriel E Gitman
(74) *Attorney, Agent, or Firm* — STAAS & HALSEY LLP

(57) ABSTRACT

Provided are a method and an electronic device for detecting contamination of a filter. When a revolutions per minute (RPM) of a fan motor increases so as to exceed a target RPM, a stabilization time is detected from a time point when the RPM of the fan motor reaches the target RPM to a time point when the RPM of the fan motor is maintained within a reference RPM difference with respect to the target RPM. When it is determined that the detected stabilization time is greater than a filter replacement threshold time, a notification to replace the filter is displayed on a display.

20 Claims, 13 Drawing Sheets

(56)                    References Cited

FOREIGN PATENT DOCUMENTS

| | | | |
|---|---|---|---|
| KR | 10-0727678 | 6/2007 | |
| KR | 10-2007-0072787 | 7/2007 | |
| KR | 10-2010-0004044 | 1/2010 | |
| KR | 20100004044 A * | 1/2010 | ......... B01D 46/4245 |
| KR | 10-0962072 | 6/2010 | |
| KR | 10-2010-0114601 | 10/2010 | |
| KR | 10-1084009 | 11/2011 | |
| KR | 10-2016-0144685 | 12/2016 | |
| KR | 10-2018-0038094 | 4/2018 | |
| KR | 10-2019-0032892 | 3/2019 | |
| KR | 10-2019-0078278 | 7/2019 | |
| KR | 10-2020-0119609 | 10/2020 | |
| KR | 10-2022-0040192 | 3/2022 | |

OTHER PUBLICATIONS

International Search Report, PCT/ISA/210, dated Dec. 20, 2023 issued in PCT/KR2023/014196.

Written Opinion, PCT/ISA/237, dated Dec. 20, 2023 issued in PCT/KR2023/014196.

European Search Report dated Jun. 23, 2025, in European Application No. EP 23 87 2922.

Office Action dated Dec. 11, 2025, in European Application No. 23 872 922.2.

* cited by examiner

FIG. 3

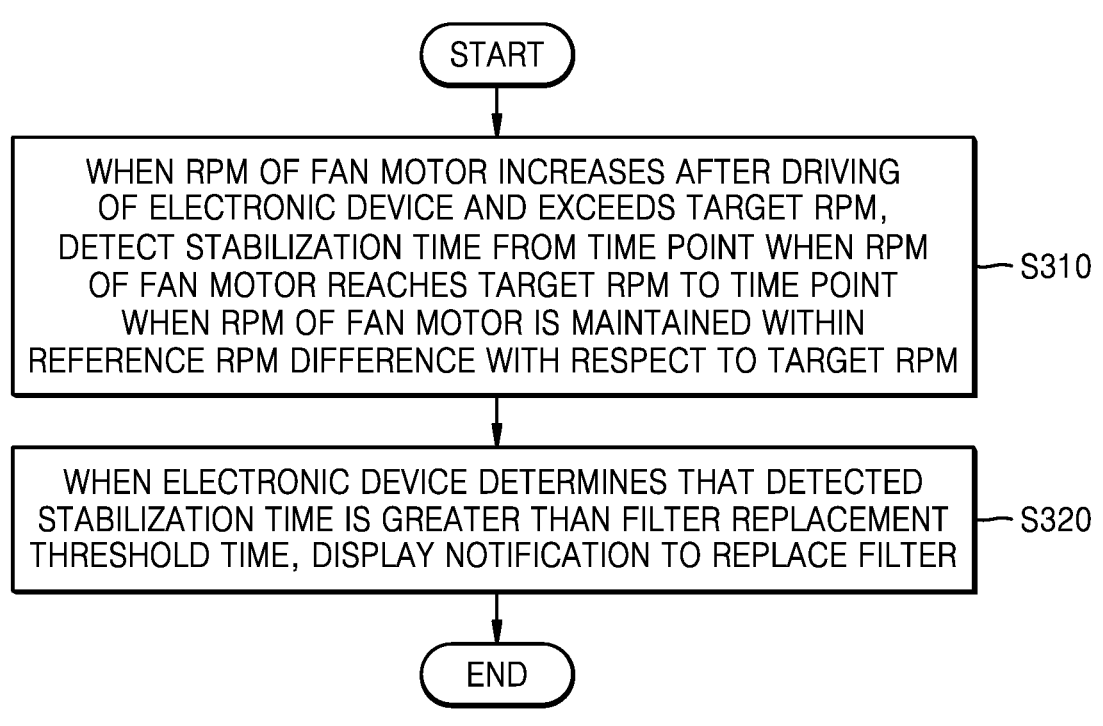

START

WHEN RPM OF FAN MOTOR INCREASES AFTER DRIVING OF ELECTRONIC DEVICE AND EXCEEDS TARGET RPM, DETECT STABILIZATION TIME FROM TIME POINT WHEN RPM OF FAN MOTOR REACHES TARGET RPM TO TIME POINT WHEN RPM OF FAN MOTOR IS MAINTAINED WITHIN REFERENCE RPM DIFFERENCE WITH RESPECT TO TARGET RPM — S310

WHEN ELECTRONIC DEVICE DETERMINES THAT DETECTED STABILIZATION TIME IS GREATER THAN FILTER REPLACEMENT THRESHOLD TIME, DISPLAY NOTIFICATION TO REPLACE FILTER — S320

END

METHOD AND ELECTRONIC DEVICE FOR DETECTING CONTAMINATION OF FILTER

CROSS-REFERENCE TO RELATED APPLICATIONS

This is a continuation application, filed under 35 U.S.C. § 111 (a), of International Application PCT/KR2023/014196, filed Sep. 19, 2023, it being further noted that foreign priority benefit is based upon Korean Patent Application No. 10-2022-0123477, filed Sep. 28, 2022, in the Korean Intellectual Property Office, the disclosures of which are incorporated by reference herein in their entireties.

TECHNICAL FIELD

The disclosure relates to an electronic device for detecting contamination of a filter, a method of controlling the electronic device, and a computer-readable recording medium having stored therein a computer program for performing the method of controlling the electronic device.

BACKGROUND ART

The performance of air purifiers may be determined by the degree to which a filter is able to filter out contaminants. The degree to which the filter is able to filter out contaminants is influenced by the accumulated use time of the filter and the level of contaminants accumulated in the filter.

In general, an air purifier estimates a filter contamination level according to the accumulated use time of the filter, without taking into account the level of contaminants accumulated in the filter. Accordingly, in some cases, a filter replacement notification may be displayed for a user even though little contaminant accumulates on a filter, or filter replacement may not be notified even though a lot of contaminant accumulates on the filter.

DESCRIPTION OF EMBODIMENTS

Technical Solution to Problem

According to an aspect of an embodiment of the disclosure, an electronic device may include a fan that is rotatable to suction air through a filter, a fan motor configured to rotate the fan, at least one memory storing one or more instructions, and at least one processor configured to execute the one or more instructions stored in the at least one memory to, (a) when a revolutions per minute (RPM) of the fan motor increases while rotating the fan so as to exceed a target RPM, detect a stabilization time from a time point when the RPM of the fan motor reaches the target RPM to a time point when the RPM of the fan motor is maintained within a reference RPM difference with respect to the target RPM, (b) determine whether the detected stabilization time is greater than a filter replacement threshold time, and (c) when it is determined that the detected stabilization time is greater than the filter replacement threshold time, perform control so that a notification to replace the filter is displayed on a display.

According to an aspect of an embodiment of the disclosure, the at least one processor may be further configured to execute the one or more instructions stored in the at least one memory to detect, as the stabilization time, a time from the time point when the RPM of the fan motor reaches the target RPM to the time point when the RPM of the fan motor is maintained within the reference RPM difference with respect to the target RPM for a stabilization maintenance time.

According to an aspect of an embodiment of the disclosure, the filter replacement threshold time may be based on an air volume level set in the electronic device.

According to an aspect of an embodiment of the disclosure, the at least one processor may be further configured to execute the one or more instructions stored in the at least one memory to, when the RPM of the fan motor exceeds the target RPM, perform feedback control on the fan motor so that the RPM of the fan motor is maintained within the reference RPM difference with respect to the target RPM.

According to an aspect of an embodiment of the disclosure, the at least one processor may be further configured to execute the one or more instructions stored in the at least one memory to, when a contamination level of the filter is greater than or equal to a level at which filter replacement is required, perform feed-forward control on the fan motor until the RPM of the fan motor reaches the target RPM, so that the stabilization time due to an overshoot of the RPM of the fan motor is greater than or equal to the filter replacement threshold time.

According to an aspect of an embodiment of the disclosure, the at least one processor may be further configured to execute the one or more instructions stored in the at least one memory to determine whether filter replacement is required, based on an artificial intelligence model that outputs whether the filter replacement is required when the detected stabilization time and a use time after the stabilization time is detected are input as input data to the artificial intelligence model.

According to an aspect of an embodiment of the disclosure, the at least one processor may be further configured to execute the one or more instructions stored in the at least one memory to, when it is determined that the detected stabilization time is not greater than the filter replacement threshold time, (i) determine whether filter replacement is required based on an artificial intelligence model that outputs whether the filter replacement is required when the detected stabilization time and a use time after the stabilization time is detected are input as input data to the artificial intelligence model, and (ii) when it is determined that filter replacement is required based on the artificial intelligence model, perform control to display a notification to replace the filter.

According to an aspect of an embodiment of the disclosure, the at least one processor may be further configured to execute the one or more instructions stored in the at least one memory to determine whether the detected stabilization time is greater than or equal to a filter unopening reference time, and, when it is determined that the detected stabilization time is greater than or equal to a filter unopening reference time, perform control to output a notification guiding to unwrap the filter.

According to an aspect of an embodiment of the disclosure, the at least one processor may be further configured to execute the one or more instructions stored in the at least one memory to determine a contamination level of the filter based on the detected stabilization time, and perform control to display contamination information indicating the determined contamination level.

According to an aspect of an embodiment of the disclosure, the at least one processor may be further configured to execute the one or more instructions stored in the at least one memory to calculate an expected replacement time of the filter based on the determined contamination level of the filter, and perform control to display the calculated expected replacement time.

According to an aspect of an embodiment of the disclosure, a method may be provided of controlling an electronic device that includes a fan that is rotatable to suction air through a filter, and a fan motor configured to rotate the fan, and the method may include (a) when a revolutions per minute (RPM) of the fan motor increases so as to exceed a target RPM, detecting a stabilization time from a time point when the RPM of the fan motor reaches the target RPM to a time point when the RPM of the fan motor is maintained within a reference RPM difference with respect to the target RPM, (b) determining whether the detected stabilization time is greater than a filter replacement threshold time, and (c) when it is determined that the detected stabilization time is greater than the filter replacement threshold time, performing control so that a notification to replace the filter is displayed.

According to an aspect of an embodiment of the disclosure, the detecting of the stabilization time from the time point when the RPM of the fan motor reaches the target RPM to the time point when the RPM of the fan motor is maintained within the reference RPM difference with respect to the target RPM may include detecting, as the stabilization time, a time from the time point when the RPM of the fan motor reaches the target RPM to the time point when the RPM of the fan motor is maintained within the reference RPM difference with respect to the target RPM for a stabilization maintenance time.

According to an aspect of an embodiment of the disclosure, the filter replacement threshold time may be based on an air volume level set in the electronic device.

According to an aspect of an embodiment of the disclosure, the method may further include, when the RPM of the fan motor exceeds the target RPM, performing feedback control on the fan motor so that the RPM of the fan motor is maintained within the reference RPM difference with respect to the target RPM.

According to an aspect of an embodiment of the disclosure, the method may further include, when a contamination level of the filter is greater than or equal to a level at which filter replacement is required, performing feed-forward control on the fan motor until the RPM of the fan motor reaches the target RPM, so that the stabilization time due to an overshoot of the RPM of the fan motor is greater than or equal to the filter replacement threshold time.

According to an aspect of an embodiment of the disclosure, the method may further include determining whether filter replacement is required, based on an artificial intelligence model that outputs whether the filter replacement is required when the detected stabilization time and a use time after the stabilization time is detected are input as input data to the artificial intelligence model.

According to an aspect of an embodiment of the disclosure, the method may further included, when it is determined that the detected stabilization time is not greater than the filter replacement threshold time, (i) determining whether filter replacement is required based on an artificial intelligence model that outputs whether the filter replacement is required when the detected stabilization time and a use time after the stabilization time is detected are input as input data to the artificial intelligence model, and (ii) when it is determined that filter replacement is required based on the artificial intelligence model, perform control to displaying a notification to replace the filter.

According to an aspect of an embodiment of the disclosure, the method may further include determining whether the detected stabilization time is greater than or equal to a filter unopening reference time, and, when it is determined that the detected stabilization time is greater than or equal to the filter unopening reference time, performing control to output a notification guiding to unwrap the filter.

According to an aspect of an embodiment of the disclosure, the method may further include determining a contamination level of the filter based on the detected stabilization time; and performing control to display contamination information indicating the determined contamination level.

According to an aspect of an embodiment of the disclosure, a computer-readable recording medium having recorded thereon a computer program for causing a computer to perform the above method may be provided.

BRIEF DESCRIPTION OF DRAWINGS

FIG. 3 is a flowchart of a method, performed by an electronic device, of determining whether a replacement of a filter is required, according to an embodiment of the disclosure.

MODE OF DISCLOSURE

Figure 1:
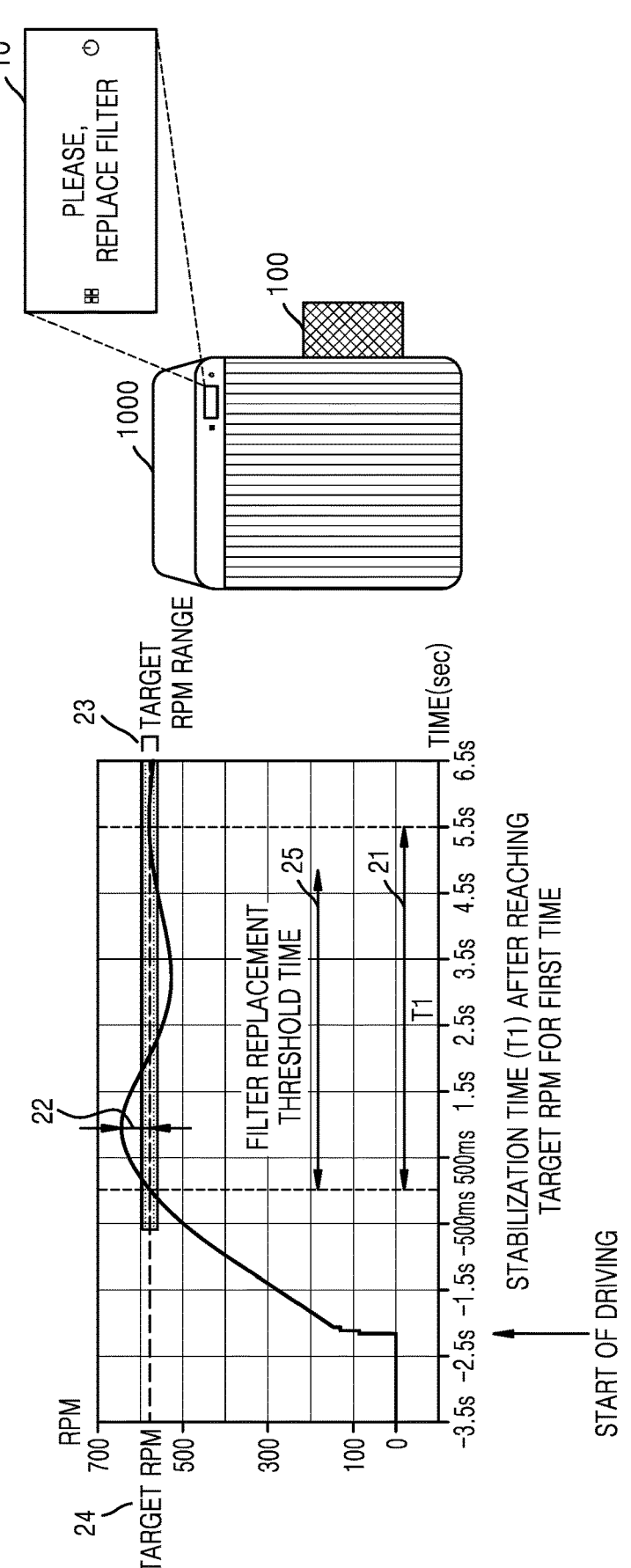
FIG. 1 illustrates a method, performed by an electronic device, of determining whether a replacement of a filter is required, based on a stabilization time of a fan motor, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described with reference to the accompanying drawings, so that those of ordinary skill in the art may easily carry out the disclosure. However, the disclosure may be implemented in various different forms and is not limited to the embodiments of the disclosure described herein. In addition, in order to clearly explain the disclosure, parts irrelevant to the description are omitted in the drawings, and similar reference numerals are assigned to similar parts throughout the specification.

As for the terms as used in the disclosure, common terms that are currently widely used are selected as much as possible while taking into account the functions in the disclosure. However, these terms may refer to various other terms depending on the intention of those of ordinary skill in the art, precedents, the emergence of new technology, and the like. Therefore, the terms as used herein should be defined based on the meaning of the terms and the description throughout the disclosure rather than simply the names of the terms.

In addition, it will be understood that although the terms "first," "second," etc. may be used herein to describe various elements, these elements should not be limited by these terms. These terms are only used to distinguish one element from another.

The terms as used in the disclosure are only used to describe specific embodiments of the disclosure, and are not intended to limit the disclosure. The singular forms as used herein are intended to include the plural forms as well unless the context clearly indicates otherwise. In addition, it will be understood that when a portion is referred to as being "connected to" another portion, it may be "directly connected to" the other portion or "electrically connected to" the other portion with intervening portions therebetween. It will be understood that the terms "comprise," "include," or "have" as used herein specify the presence of stated elements, but do not preclude the presence or addition of one or more other elements.

The expressions "in some embodiments of the disclosure" or "in an embodiment of the disclosure" appearing in various places in the present specification do not necessarily all refer to the same embodiment.

An embodiment of the disclosure provide an electronic device for determining a contamination level of a filter and a method of controlling the same.

In addition, an embodiment of the disclosure provide an electronic device for providing information about contamination of a filter and a method of controlling the same.

FIG. 1 illustrates a method, performed by an electronic device, of determining whether a replacement of a filter is required, based on a stabilization time of a fan motor, according to an embodiment of the disclosure.

Referring to FIG. 1, an electronic device 1000 may detect a time T1 21 from a time point when a revolutions per minute (RPM) of the fan motor reaches a target RPM 24 after the driving of the electronic device 1000 starts to a time point when the RPM of the fan motor stabilizes. When the time T1 21 until the RPM of the fan motor stabilizes is greater than a preset filter replacement threshold time 25, the electronic device 1000 may determine that a contamination level of a filter 100 is greater than or equal to a required filter replacement level. When the electronic device 1000 determines that the contamination level of the filter 100 is greater than or equal to the required filter replacement level, the electronic device 1000 may output a notification 10 that filter replacement is required.

As the use of the filter 100 continues, contaminants may accumulate on the filter 100. As contaminants accumulate on the filter 100, the filtering performance of the filter 100 may deteriorate. In addition, as contaminants accumulate on the filter 100, the load of the fan motor that suctions air may decrease. As the load of the fan motor decreases, the overshoot of the RPM of the fan motor may easily occur during the driving of the fan motor and the magnitude of the overshoot may increase at the same voltage.

For example, referring to FIG. 1, as the driving of the electronic device 1000 starts, the electronic device 1000 may apply a driving voltage to the fan motor. As the driving voltage is applied to the fan motor, the RPM of the fan motor may continuously increase.

When the RPM of the fan motor increases and reaches a target RPM, an overshoot 22 of the RPM of the fan motor may occur according to the contamination level of the filter 100. In this case, a greater overshoot may occur as the contamination level of the filter 100 increases, and no overshoot may occur when the contamination level of the filter 100 is low.

The electronic device 1000 may detect the stabilization time T1 21 from a time point when the RPM of the fan motor exceeds the target RPM 24 and the overshoot 22 occurs to a time point when the RPM of the fan motor stabilizes within a preset target RPM range 23. The target RPM range 23 may refer to a range within a reference RPM difference with respect to the target RPM 24. For example, when the target RPM 24 is 500 rpm and the reference RPM difference is 10 rpm, the target RPM range 23 may be about 490 rpm to about 510 rpm.

As the contamination level of the filter 100 increases, the magnitude of the overshoot 22 may increase. As the magnitude of the overshoot 22 increases, the stabilization times T1 21 may increase. Accordingly, when the stabilization time T1 21 is greater than the preset filter replacement threshold time 25, the electronic device 1000 may output a notification 10 that the replacement of the filter 100 is required. In addition, as the electronic device 1000 determines that the contamination level of the filter 100 is greater than or equal to the required filter replacement level, the electronic device 1000 may output a notification to clean the filter 100.

The electronic device 1000 may display text in the notification 10 to replace or clean the filter 100. In addition, the electronic device 1000 may output notification sound or light-emitting diode (LED) blinking indicating to replace or clean the filter 100.

The electronic device 1000 may more accurately determine the contamination level of the filter 100 by using the stabilization time T1 21 of the RPM of the fan motor. In a case where the contamination level of the filter 100 is estimated based on an existing cumulative time, the contamination level of the filter 100 may not be accurately determined. Even in a case where the contamination level of the filter 100 is determined by using a differential pressure sensor, a sensor that detects the color of the filter 100, or an illumination sensor, the contamination level of the filter 100 may not be accurately determined because the contamination of the filter 100 is not directly measured. Furthermore, the structure of the a filter becomes complicated and additional costs are incurred.

Because the stabilization time T1 21 of the RPM of the fan motor accurately reflects the contamination level of the filter 100, the electronic device 1000 may more accurately determine the contamination level of the filter 100 and an additional filter is not required.

According to an embodiment of the disclosure, the electronic device 1000 may perform feed-forward control on the fan motor up to the target RPM 24. For example, the electronic device 1000 may increase the voltage applied to the fan motor until the RPM of the fan motor reaches the target RPM 24, without taking into account the current RPM of the fan motor. In this case, when the contamination level of the filter 100 is greater than or equal to the required filter replacement level, the rate of increase of the applied voltage may be determined in advance so that the stabilization time due to the overshoot is greater than or equal to the filter replacement threshold time 25. The feed-forward control may be referred to as non-feedback control.

According to an embodiment of the disclosure, when the RPM of the fan motor exceeds the target RPM 24, the electronic device 1000 may perform feedback control on the fan motor. For example, the electronic device 1000 may perform the feedback control on the fan motor by detecting the RPM of the fan motor in real time, lowering the voltage applied to the fan motor when the RPM of the fan motor exceeds the upper limit of the target RPM range 23, and raising the voltage applied to the fan motor when the RPM of the fan motor drops below the lower limit of the target RPM range 23. By performing the feedback control on the fan motor, the electronic device 1000 may stabilize the RPM of the fan motor by maintaining the RPM of the fan motor within the target RPM range 23.

According to an embodiment of the disclosure, the electronic device 1000 may determine whether the replacement of the filter 100 is required, based on an artificial intelligence model that receives the stabilization time T1 21 and the use time as input values and outputs whether the replacement of the filter 100 is required.

Accordingly, even after the electronic device 1000 determines that it is not time to replace the filter 100, based on the stabilization time T1 21 detected when the driving of the electronic device 1000 starts, the electronic device 1000 may output a notification to replace the filter 100 when the electronic device 1000 determines that the replacement of the filter 100 is required, based on the output value of the artificial intelligence model during the driving of the electronic device 1000.

According to an embodiment of the disclosure, in addition to the filter replacement threshold time 25, which is a reference time for determining whether filter replacement is required, a filter unopening reference time, which is a reference time for determining whether the filter 100 is unopened, may be prestored in the electronic device 1000. When the stabilization time T1 21 exceeds the filter unopening reference time beyond the filter replacement threshold time 25, the electronic device 1000 may output a notification guiding to unwrap the filter 100.

According to an embodiment of the disclosure, the electronic device 1000 may determine the contamination level of the filter 100 based on the detected stabilization time T1 21. In addition, the electronic device 1000 may display the determined contamination level of the filter 100.

According to an embodiment of the disclosure, the electronic device 1000 may calculate an expected replacement time of the filter 100 based on the determined contamination level of the filter 100 and display the calculated expected replacement time.

The filter 100 may refer to different types of filters. For example, the electronic device 1000 may include different types of filters, and the filters may overlap each other. The electronic device 1000 may determine the contamination levels of all the filters based on the stabilization time T1 21 of the fan motor.

In addition, when the stabilization time T1 21 of the fan motor is greater than the filter replacement threshold time 25, the electronic device 1000 may output a notification to replace some filters and clean the others. In addition, when the stabilization time T1 21 of the fan motor is greater than the filter replacement threshold time 25, the electronic device 1000 may output a notification that the replacement of some filters (e.g., pre-filters) previously determined among the filters is required. In addition, when the stabilization time T1 21 of the fan motor is greater than the filter replacement threshold time 25, the electronic device 1000 may output a notification that the cleaning of some filters (e.g., high efficiency particulate air (HEPA) filters) previously determined among the filters is required. In addition, the electronic device 1000 may display an image or text explaining a replacement method together with a notification that the replacement of the filter is required. Furthermore, the electronic device 1000 may display an image or text explaining a washing method together with a notification that the cleaning of the filter is required.

Because the electronic device 1000 determines the contamination level of the filter 100 based on the stabilization time T1 21 of the fan motor determined by the concentration of the contaminants in the filter 100, the electronic device 1000 may accurately calculate the contamination level of the filter 100. After the filter 100 is replaced, even when the electronic device 1000 does not receive a user input of setting that the filter 100 has been replaced, the electronic device 1000 may identify that the filter 100 is not contaminated.

Figure 2:
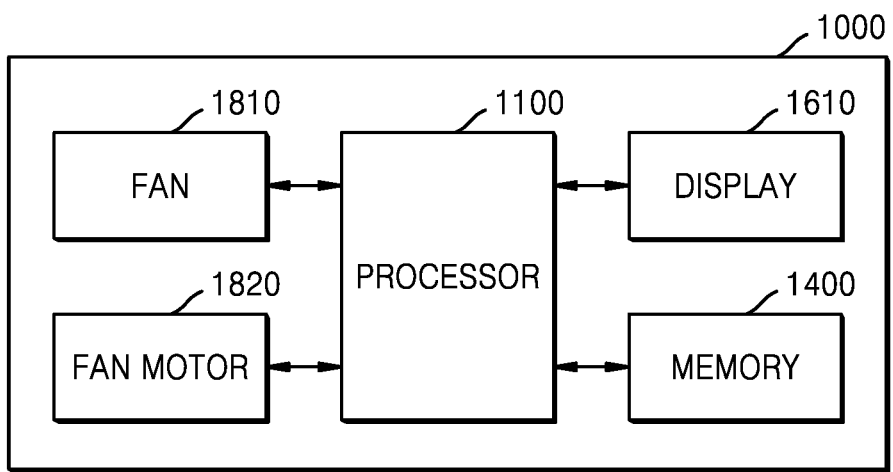
FIG. 2 illustrates a block diagram of an electronic device according to an embodiment of the disclosure.

FIG. 2 illustrates a block diagram of an electronic device 1000 according to an embodiment of the disclosure.

Referring to FIG. 2, the electronic device 1000 may include a processor 1100, a fan 1810, a fan motor 1820, a memory 1400, and a display 1610.

The processor 1100 may control the overall operation of the electronic device 1000. The processor 1100 may control the fan motor 1820, the fan 1810, and the display 1610 by executing programs stored in the memory 1400.

The electronic device 1000 may include a device that filters out contaminants in the air by suctioning air through a filter. The electronic device 1000 may include, for example, an air purifier, an air conditioner, a ventilator, an electric fan, a ventilation system, and a total heat exchanger, but the disclosure is not limited thereto.

The display 1610 may output image data on a display panel (not shown) under the control of the processor 1100. The display panel (not shown) may include at least one of a liquid crystal display, a thin-film transistor-liquid crystal display, an organic light-emitting diode display, a flexible display, a three-dimensional (3D) display, or an electrophoretic display.

The memory 1400 may store a variety of information, data, instructions, programs, and the like, which are necessary for the operation of the electronic device 1000. The memory 1400 may include at least one of volatile memory or non-volatile memory, or a combination thereof.

The electronic device 1000 may include a filter insertion space (not shown) for insertion of a filter. In addition, the electronic device 1000 may include a filter fixing member (not shown) that fixes the filter. The filter may be inserted into the filter insertion space (not shown) inside the electronic device 1000 or may be attached to the outside of the electronic device 1000.

The fan 1810 may be a mechanism having rotary blades around a rotational shaft.

The fan motor 1820 may be connected to the rotational shaft of the fan 1810 and may rotate the fan 1810. The fan motor 1820 may include a brushless direct current (DC) electric (BLDC) motor, a DC motor, and an alternating current (AC) motor, but the disclosure is not limited thereto.

When the driving of the electronic device 1000 starts, the processor 1100 may apply a driving voltage to the fan motor 1820. When the driving voltage is applied to the fan motor 1820, the fan motor 1820 may rotate.

When the fan motor 1820 rotates, the fan 1810 connected to the fan motor 1820 may rotate. Due to the rotation of the fan 1810, external air may be suctioned into the electronic device 1000. In addition, the suctioned external air may pass through the filter inside the electronic device 1000 and may discharge to the outside again, and contaminants in the external air may be filtered out by the filter.

Even when the same voltage is applied to the fan motor 1820, the RPM of the fan motor 1820 may differ depending on the load of the fan motor 1820. The fan motor 1820 may periodically output the RPM of the fan motor 1820, and the processor 1100 may periodically receive the RPM of the fan motor 1820 from the fan motor 1820.

When the RPM of the fan motor 1820 increases to reach the target RPM, the RPM of the fan motor 1820 may overshoot according to the contamination level of the filter.

The processor 1100 may detect the stabilization time T1 from a time point when the RPM of the fan motor 1820 exceeds the target RPM and the overshoot occurs to a time point when the RPM of the fan motor 1820 stabilizes within the target RPM range. When the stabilization time T1 is greater than the preset filter replacement threshold time, the processor 1100 may determine that the contamination level of the filter exceeds the filter replacement contamination level and may output a notification that the replacement of the filter is required.

FIG. 3 is a flowchart of a method, performed by the electronic device 1000, of determining whether the replacement of the filter is required, according to an embodiment of the disclosure.

In operation S310, when an RPM of a fan motor increases after driving of the electronic device 1000 and exceeds a target RPM, the electronic device 1000 may detect a stabilization time from a time point when the RPM of the fan motor reaches the target RPM to a time point when the RPM of the fan motor is maintained within a reference RPM difference with respect to the target RPM.

According to an embodiment of the disclosure, the electronic device 1000 may perform feed-forward control on the fan motor until the RPM of the fan motor reaches the target RPM, so that the stabilization time due to the overshoot of the RPM of the fan motor is greater than or equal to a filter replacement threshold time when the contamination level of the filter is greater than or equal to a required filter replacement level.

In addition, according to an embodiment of the disclosure, when the RPM of the fan motor exceeds the target RPM, the electronic device 1000 may perform feedback control on the fan motor so that the RPM of the fan motor is maintained within the reference RPM difference with respect to the target RPM.

In addition, according to an embodiment of the disclosure, the electronic device 1000 may detect, as the stabilization time, the time from the time point when the RPM of the fan motor reaches the target RPM to the time point when the RPM of the fan motor is maintained for a stabilization maintenance time T2 within the reference RPM difference with respect to the target RPM.

In operation S320, when the electronic device 1000 determines that the detected stabilization time is greater than the filter replacement threshold time, the electronic device 1000 may display a notification to replace the filter.

According to an embodiment of the disclosure, the electronic device 1000 may obtain the filter replacement threshold time corresponding to a set air volume level. When the electronic device 1000 determines that the detected stabilization time is greater than the obtained filter replacement threshold time, the electronic device 1000 may display a notification to replace the filter.

According to an embodiment of the disclosure, the electronic device 1000 may determine whether the replacement of the filter is required, based on an artificial intelligence model that outputs whether the replacement of the filter is required when the detected stabilization time and the use time after the detection of the stabilization time are input as input data.

Accordingly, even after the electronic device 1000 determines that it is not time to replace the filter, based on the detected stabilization time, the electronic device 1000 may display a notification to replace the filter when the electronic device 1000 determines that the replacement of the filter is required, based on the output value of the artificial intelligence model during the driving of the electronic device 1000.

According to an embodiment of the disclosure, when the electronic device 1000 determines that the detected stabilization time is greater than or equal to the filter unopening reference time, the electronic device 1000 may output a notification guiding to unwrap the filter.

According to an embodiment of the disclosure, the electronic device 1000 may determine the contamination level of the filter based on the detected stabilization time and may display contamination information indicating the determined contamination level of the filter.

According to an embodiment of the disclosure, the electronic device 1000 may calculate an expected replacement time of the filter based on the determined contamination level of the filter and may display the calculated expected replacement time of the filter.

In addition, according to an embodiment of the disclosure, information indicating that the replacement of the filter is required, information indicating that the filter has not been unwrapped, the contamination level of the filter, or the unexpected replacement time of the filter may be displayed on a device that transmits and receives information to and from the electronic device 1000. For example, the electronic device 1000 may transmit, to a server, the information indicating that the replacement of the filter is required, the information indicating that the filter has not been unwrapped, the contamination level of the filter, or the expected replacement time of the filter. In addition, the server may transmit information received from the electronic device 1000 to a device corresponding to identification information of the electronic device 1000 or identification information of a user of the electronic device 1000. In addition, the device may display the information received from the server.

Figure 4:
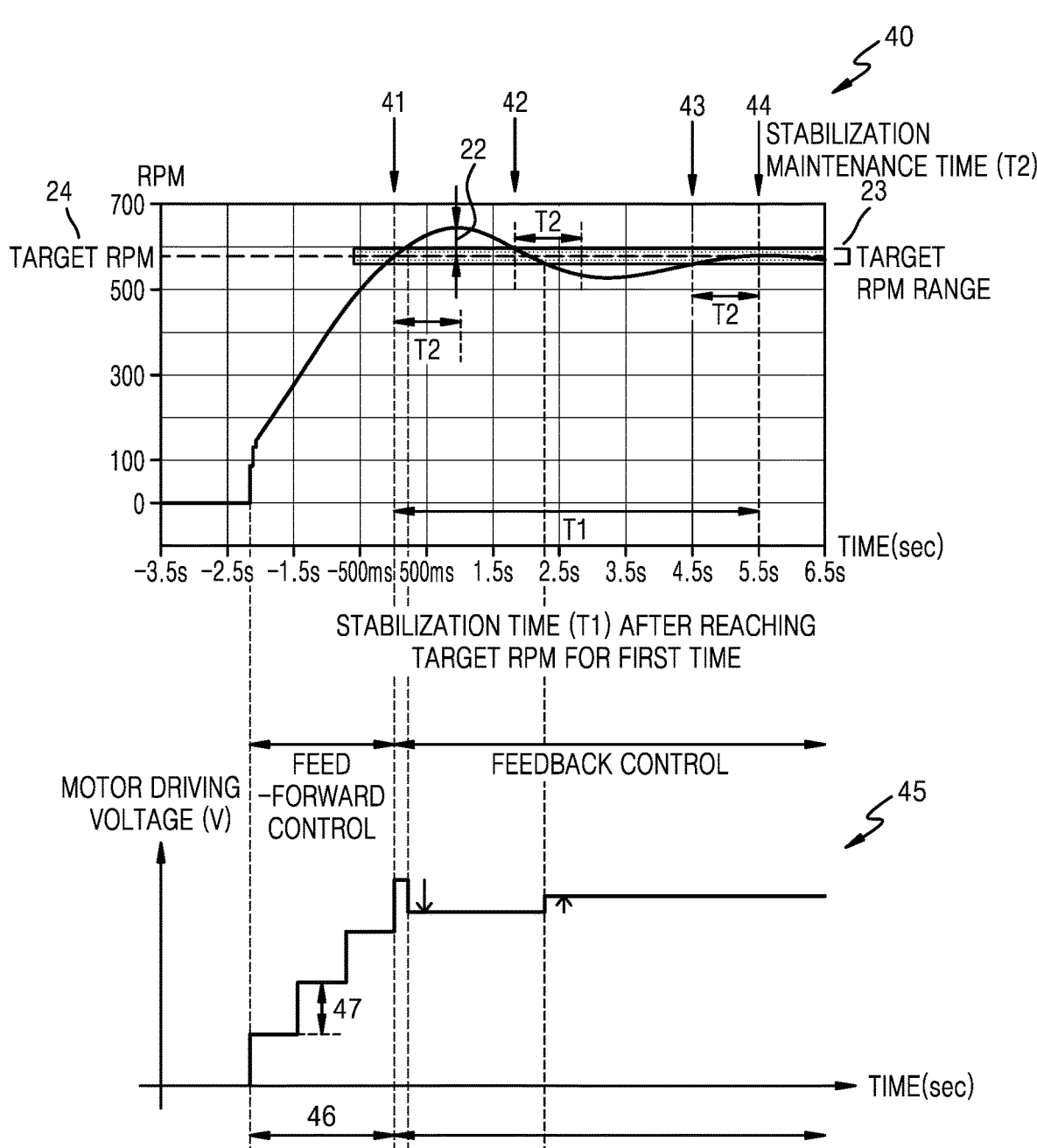
FIG. 4 illustrates a method, performed by an electronic device, of controlling a fan motor, according to an embodiment of the disclosure.

FIG. 4 illustrates a method, performed by the electronic device 1000, of controlling a fan motor, according to an embodiment of the disclosure.

Referring to FIG. 4, the electronic device 1000 may perform feed-forward control on the fan motor until the RPM of the fan motor reaches a target RPM 24 and may perform feedback control on the fan motor when an over-shoot 22 occurs, that is, when the RPM of the fan motor exceeds a target RPM range 23.

A motor driving voltage graph 45 over time shows the magnitude of the voltage applied to the fan motor over time. In addition, an RPM graph 40 over time shows change in RPM of the fan motor when the voltage shown in the motor driving voltage graph 45 over time is applied to the fan motor.

The electronic device 1000 may perform feed-forward control on the fan motor until the RPM of the fan motor reaches the target RPM 24. For example, the electronic device 1000 may increase the driving voltage of the fan motor until the RPM of the fan motor reaches the target RPM 24, without taking into account the current RPM of the fan motor.

For example, when the fan motor is a BLDC motor, the electronic device 1000 may perform feed-forward control on the fan motor by performing BLDC step control on the BLDC motor.

For example, when the contamination level of the filter is greater than or equal to a required filter replacement level, the electronic device 1000 may adjust BLDC step control parameters so that the stabilization time T1 due to the overshoot 22 is greater than or equal to a filter replacement threshold time. The contamination level of the filter at which the replacement of the filter is required may refer to a level at which the weight of contaminants accumulated on the filter is greater than or equal to a preset weight or a level at which the volume of contaminants accumulated on the filter is greater than or equal to a preset volume. The preset weight or the preset volume may be determined experimentally.

The BLDC step control parameters may include an increase value 47, a starting maximum step, and a rising time 46. In addition, the overshoot 22 may refer to an overshoot that occurs when the RPM of the motor reaches the target RPM 24 for the first time.

In this case, the rising time 46 may refer to the time of the feed-forward section, the increase value 47 may refer to the RPM number to increase at one time, and the starting maximum step may refer to the number of times the increase value increases up to the target RPM 24 for the rising time. As the rising time is reduced, as the increase value 47 is increased, and as the starting maximum step is reduced, the overshoot 22 of the RPM of the fan motor may be increased.

When the electronic device 1000 detects that the RPM of the fan motor reaches the target RPM 24, the electronic device 1000 may determine whether the overshoot has occurred. When the RPM of the fan motor exceeds the target RPM range 23, the electronic device 1000 may determine that the overshoot has occurred. For example, when the RPM of the fan motor exceeds the target RPM range 23 within a preset stabilization maintenance time T2 from a time point 41 when the RPM of the fan motor reaches the target RPM 24, the electronic device 1000 may determine that the overshoot has occurred. In addition, when the RPM of the fan motor does not exceed the target RPM range 23 for the preset stabilization maintenance time T2 from the time point 41 when the RPM of the fan motor reaches the target RPM 24, the electronic device 1000 may determine that the overshoot has not occurred. The stabilization main-tenance time T2 may refer to a minimum maintenance time for determining whether the RPM of the fan motor stabilizes and may be prestored in the electronic device 1000 in correspondence to an air volume.

When the electronic device 1000 determines that the overshoot has occurred, the electronic device 1000 may perform feedback control on the fan motor. The electronic device 1000 may increase or decrease the driving voltage of the fan motor so that the RPM of the fan motor converges within the target RPM range 23, by taking into account the current RPM of the fan motor.

Referring to FIG. 4, when the electronic device 1000 determines that the RPM of the fan motor exceeds the target RPM range 23 within the stabilization maintenance time T2 from the time point 41 when the RPM of the fan motor reaches the target RPM 24 for the first time, the electronic device 1000 may determine that the overshoot 22 has occurred and may lower the driving voltage of the fan motor. As the driving voltage of the fan motor is lowered, the RPM of the fan motor may decrease again.

In addition, due to the lowered driving voltage of the fan motor, the overshot RPM of the fan motor drops below the target RPM range 23 within the stabilization maintenance time T2 from the time point 42 when the RPM of the fan motor reaches the target RPM range 23 again. Therefore, the electronic device 1000 may determine that the RPM of the fan motor is not stabilized and may increase the driving voltage of the fan motor. As the driving voltage of the fan motor is increased, the RPM of the fan motor may increase again.

In addition, due to the increased driving voltage of the fan motor, the RPM of the fan motor is maintained within the target RPM range 23 for the stabilization maintenance time T2 from the time point 43 when the RPM of the fan motor increases up to the target RPM again. Therefore, the elec-tronic device 1000 may determine that the RPM of the fan motor stabilizes. When the electronic device 1000 deter-mines that the RPM of the fan motor stabilizes, the elec-tronic device 1000 may determine, as the stabilization time T1, the time from the time point 41 when the RPM of the fan motor reaches the target RPM for the first time to the time point 44 when the stabilization maintenance time T2 ends.

In addition, the electronic device 1000 may determine whether the stabilization time is greater than or equal to the filter replacement threshold time. When the stabilization time is greater than or equal to the filter replacement threshold time, the electronic device 1000 may output a notification that the replacement of the filter is required. In addition, when the stabilization time is less than the filter replacement threshold time, the electronic device 1000 may not output a notification that the replacement of the filter is required.

Figure 5:
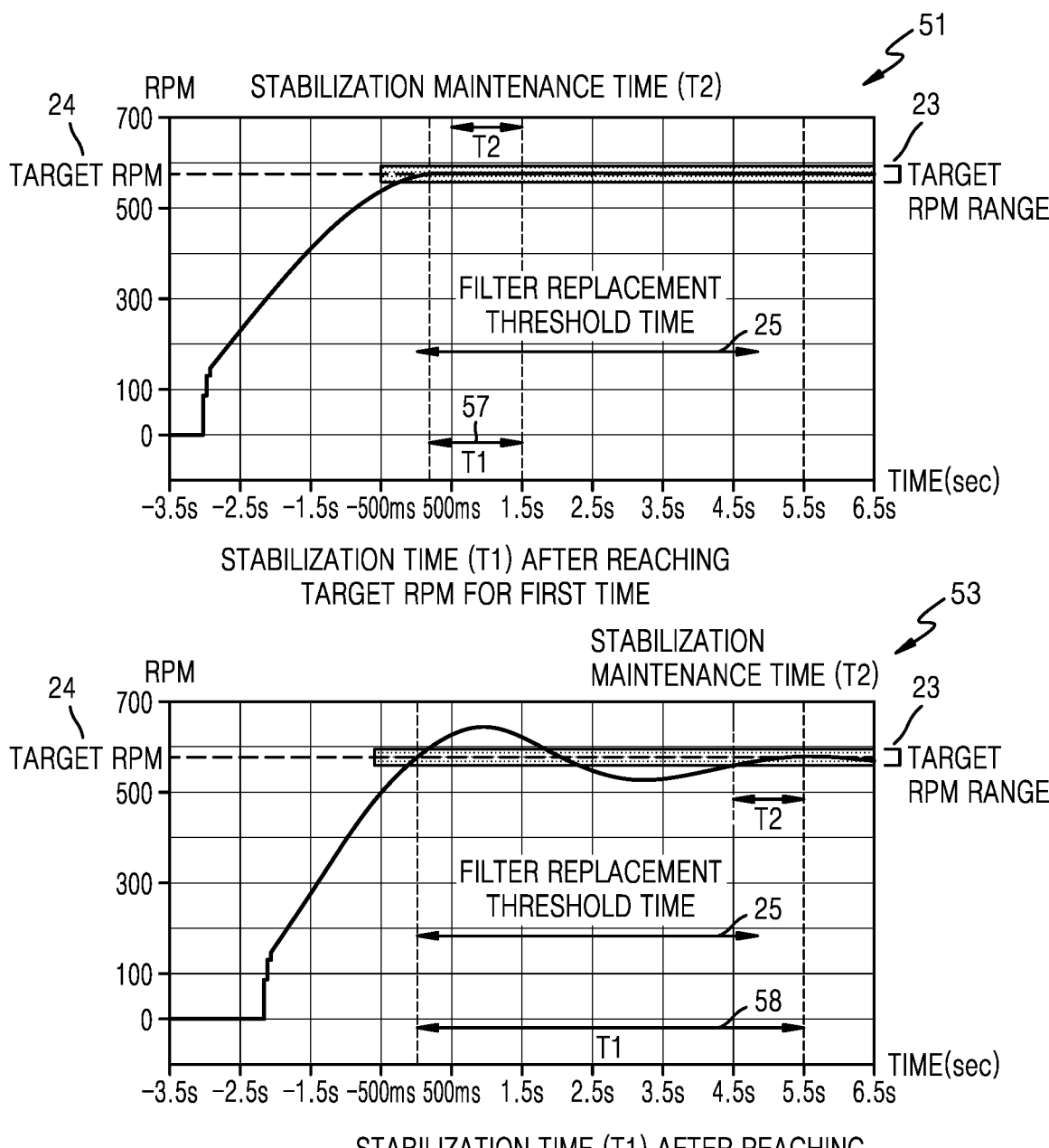
FIG. 5 illustrates a method, performed by an electronic device, of determining a filter contamination level by using a stabilization time based on the filter contamination level, according to an embodiment of the disclosure.

FIG. 5 illustrates a method, performed by the electronic device 1000, of determining the contamination level of the filter by using the stabilization time based on the contami-nation level of the filter, according to an embodiment of the disclosure.

Referring to FIG. 5, a first graph 51 shows the RPM of the fan motor over time when the filter is hardly contaminated. A second graph 53 shows the RPM of the fan motor over time when the filter is contaminated beyond a filter replace-ment level.

Referring to the first graph 51, when the filter is hardly contaminated, control parameters for controlling the fan motor may be preset in the electronic device 1000 so that the overshoot does not occur even when the RPM of the fan motor reaches the target RPM 24.

When the RPM of the fan motor does not exceed the target RPM range 23 for a preset time after reaching the target RPM 24, the electronic device 1000 may start counting the stabilization maintenance time T2. Because the RPM of the fan motor does not deviate from the target RPM range 23 for the stabilization maintenance time T2, the electronic device 1000 may determine, as the stabilization time 57, the time from the time point when the RPM of the fan motor has reached the target RPM 24 to the time point when the stabilization maintenance time T2 has elapsed. The electronic device 1000 may determine that the stabilization time 57 is less than the filter replacement threshold time 25 and may output a notification that the replacement of the filter is not required.

In addition, the electronic device 1000 may calculate the contamination level of the filter based on the determined stabilization time 57 and may display information about the calculated contamination level of the filter. For example, the electronic device 1000 may calculate the contamination level of the filter based on a ratio of the stabilization time 57 to the filter replacement threshold time 25. For example, when the filter replacement threshold time 25 is 1.5 seconds and the stabilization time 57 is 0.6 seconds, the electronic device 1000 may display an image or text indicating that the filter is 40% contaminated.

Referring to the second graph 53, when the contamination level of the filter exceeds the required filter replacement level, control parameters for controlling the fan motor may be preset in the electronic device 1000 so that the stabilization time due to the overshoot is greater than or equal to the filter replacement threshold time 25.

Because the overshot RPM of the fan motor does not deviate from the target RPM range 23 for the stabilization maintenance time T2, the electronic device 1000 may determine, as the stabilization time 58, the time from the time point when the RPM of the fan motor has reached the target RPM to the time point when the last stabilization maintenance time T2 has elapsed. The electronic device 1000 may determine that the stabilization time 58 is greater than the filter replacement threshold time 25 and may output a notification that the replacement of the filter is required.

In addition, the electronic device 1000 may calculate the contamination level of the filter based on a ratio of the stabilization time 58 to the filter replacement threshold time 25. For example, when the filter replacement threshold time 25 is 1.5 seconds and the stabilization time 58 is 1.7 seconds, the electronic device 1000 may display an image or text indicating that the filter is 113% contaminated.

Figure 6:
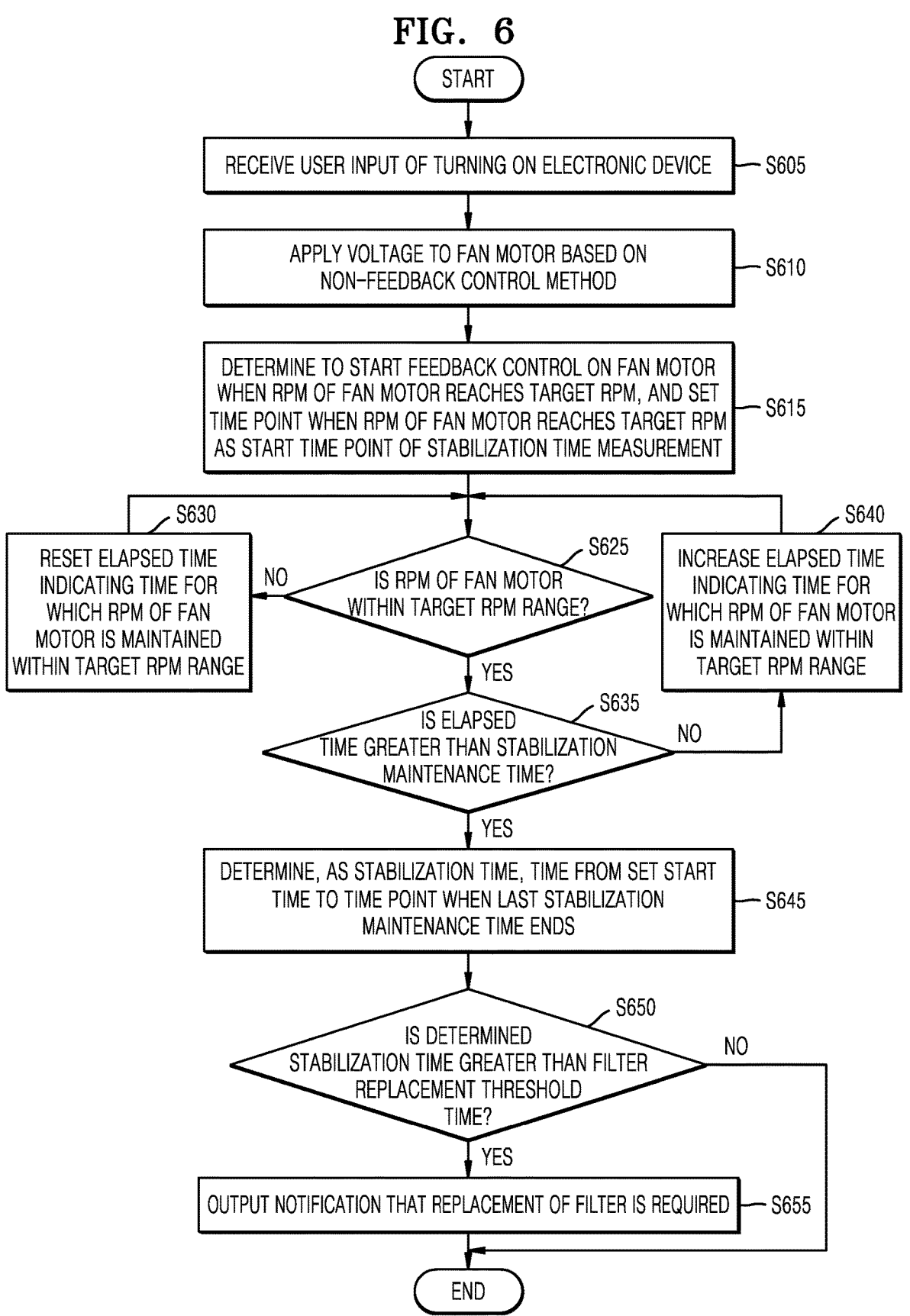
FIG. 6 is a flowchart of a method, performed by an electronic device, of determining whether a replacement of a filter is required, based on a stabilization time of a revolutions per minute (RPM) of a fan motor, according to an embodiment of the disclosure.

FIG. 6 is a flowchart of a method, performed by the electronic device 1000, of determining whether the replacement of the filter is required, based on the stabilization time of the RPM of the fan motor, according to an embodiment of the disclosure.

In operation S605, the electronic device 1000 may receive a user input of turning on the electronic device 1000.

The electronic device 1000 may receive a user input of turning on power of the electronic device 1000. In addition, the electronic device 1000 may receive a user input of starting an air cleaning function during the driving of the electronic device 1000.

In operation S610, the electronic device 1000 may apply a voltage to the fan motor based on a non-feedback control method.

When the electronic device 1000 receives the user input of turning on the electronic device 1000, the electronic device 1000 may apply voltage to the fan motor until the RPM of the fan motor reaches the target RPM, without taking into account the current RPM of the fan motor.

In operation S615, the electronic device 1000 may determine to start feedback control on the fan motor when the RPM of the fan motor reaches the target RPM and may set the time point when the RPM of the fan motor reaches the target RPM as a start time point of the stabilization time measurement.

When the RPM of the fan motor reaches the target RPM, the electronic device 1000 may determine to start feedback control on the fan motor. In addition, the electronic device 1000 may set the time point when the RPM of the fan motor reaches the target RPM as the start time point of the stabilization time measurement.

In operation S625, the electronic device 1000 may determine whether the RPM of the fan motor is within the target RPM range.

The electronic device 1000 may perform the feedback control on the fan motor by lowering the voltage applied to the fan motor when the RPM of the fan motor exceeds the target RPM range and raising the voltage applied to the fan motor when the RPM of the fan motor drops below the target RPM range.

The electronic device 1000 may periodically determine whether the RPM of the fan motor is within a target RPM range while performing the feedback control on the fan motor.

In operation S630, when the electronic device 1000 determines in operation S625 that the RPM of the fan motor is not within the target RPM range, the electronic device 1000 may reset an elapsed time for determining the elapse of the stabilization maintenance time. In addition, after resetting the elapsed time, the electronic device 1000 may return to operation S625 to determine whether the RPM of the fan motor is within the target RPM range.

In operation S635, when the electronic device 1000 determines in operation S625 that the RPM of the fan motor is within the target RPM range, the electronic device 1000 may determine whether the elapsed time is greater than the stabilization maintenance time.

In operation S640, when the electronic device 1000 determines in operation S635 that the elapsed time is not greater than the stabilization maintenance time, the electronic device 1000 may increase the elapsed time indicating the time for which the RPM of the fan motor is maintained within the target RPM range.

In operation S645, when the electronic device 1000 determines in operation S635 that the elapsed time is greater than the stabilization maintenance time, the electronic device 1000 may determine, as the stabilization time, the time from the set start time to the time point when the last stabilization maintenance time ends.

That is, when the RPM of the fan motor is within the target RPM range for the stabilization maintenance time, the electronic device 1000 may determine that the RPM of the fan motor has been stabilized and may determine, as the stabilization time, the time from the time point when the RPM of the fan motor has reached the target RPM to the time point when the last stabilization maintenance time ends.

In operation S650, the electronic device 1000 may determine whether the determined stabilization time is greater than the filter replacement threshold time.

In operation S655, when the electronic device 1000 determines in operation S650 that the stabilization time is greater than the filter replacement threshold time, the electronic device 1000 may output a notification that the replacement of the filter is required.

In addition, when the electronic device 1000 determines in operation S650 that the stabilization time is not greater than the filter replacement threshold time, the electronic device 1000 may not output a notification that the replacement of the filter is required.

Figure 7:
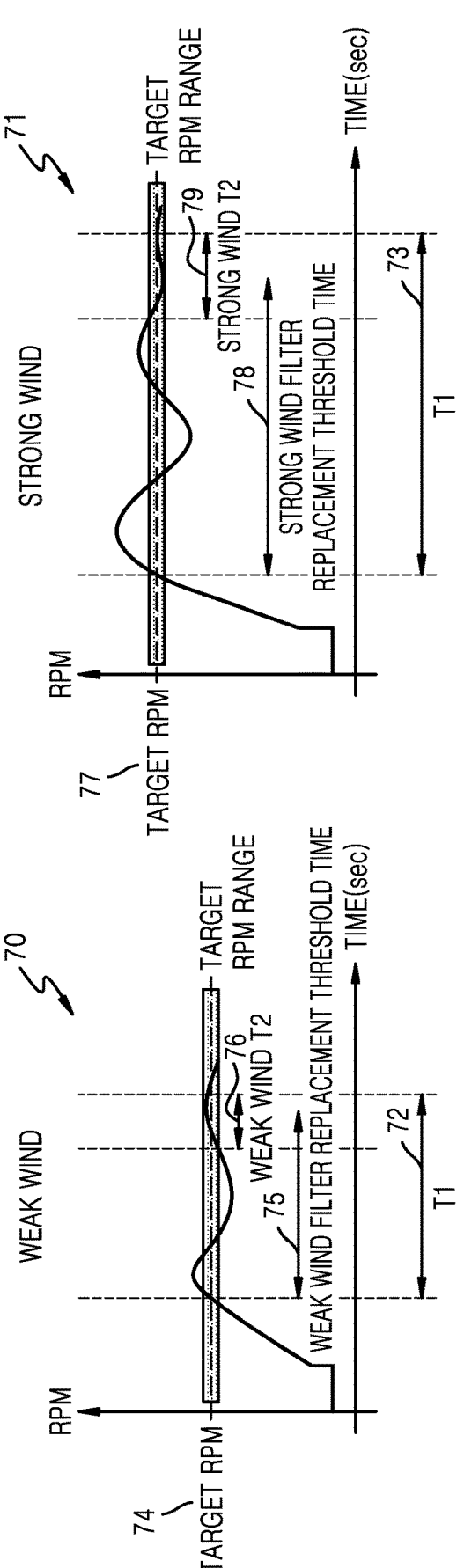
FIG. 7 illustrates a method, performed by an electronic device, of changing a filter replacement threshold time based on an air volume, according to an embodiment of the disclosure.

FIG. 7 illustrates a method, performed by the electronic device 1000, of changing a filter replacement threshold time based on an air volume, according to an embodiment of the disclosure.

Referring to FIG. 7, as the set air volume increases, the target RPM increases, and as the target RPM increases, large overshoot occurs even at the same contamination level of the filter. Therefore, the stabilization time of the RPM of the fan motor also increases. Accordingly, as the air volume increases, it is also necessary to increase the filter replacement threshold time and the stabilization maintenance time. The electronic device 1000 may store the target RPM, the filter replacement threshold time, and the stabilization maintenance time corresponding to each of a plurality of air volumes.

The electronic device 1000 may obtain the target RPM, the filter replacement threshold time, and the stabilization maintenance time T2 corresponding to the set air volume and may determine whether the replacement of the filter is required, based on the obtained filter replacement threshold time and stabilization maintenance time.

A weak wind RPM graph 70 shows a method of determining whether the replacement of the filter is required when the electronic device 1000 drives the fan motor with weak wind, and a strong wind RPM graph 71 shows a method of determining whether the replacement of the filter is required when the electronic device 1000 drives the fan motor with strong wind.

When the electronic device 1000 determines to start driving the fan motor and the set air volume is weak, the electronic device 1000 may obtain a target RPM 74 corresponding to the weak wind, a filter replacement threshold time 75 corresponding to the weak wind, and a stabilization maintenance time 76 corresponding to the weak wind.

The electronic device 1000 may determine a stabilization time 72 based on the target RPM 74 and the stabilization maintenance time 76 corresponding to the weak wind and may determine whether the replacement of the filter is required by comparing the determined stabilization time 72 with the filter replacement threshold time 75 corresponding to the weak wind.

In addition, when the set air volume is strong, the electronic device 1000 may obtain a target RPM 77 corresponding to the strong wind, a filter replacement threshold time 78 corresponding to the strong wind, and a stabilization maintenance time 79 corresponding to the strong wind.

The electronic device 1000 may determine a stabilization time 73 based on the target RPM 77 corresponding to the strong wind and the stabilization maintenance time 79 corresponding to the strong wind and may determine whether the replacement of the filter is required by comparing the determined stabilization time 73 with the filter replacement threshold time 78 corresponding to the strong wind.

Figure 8:
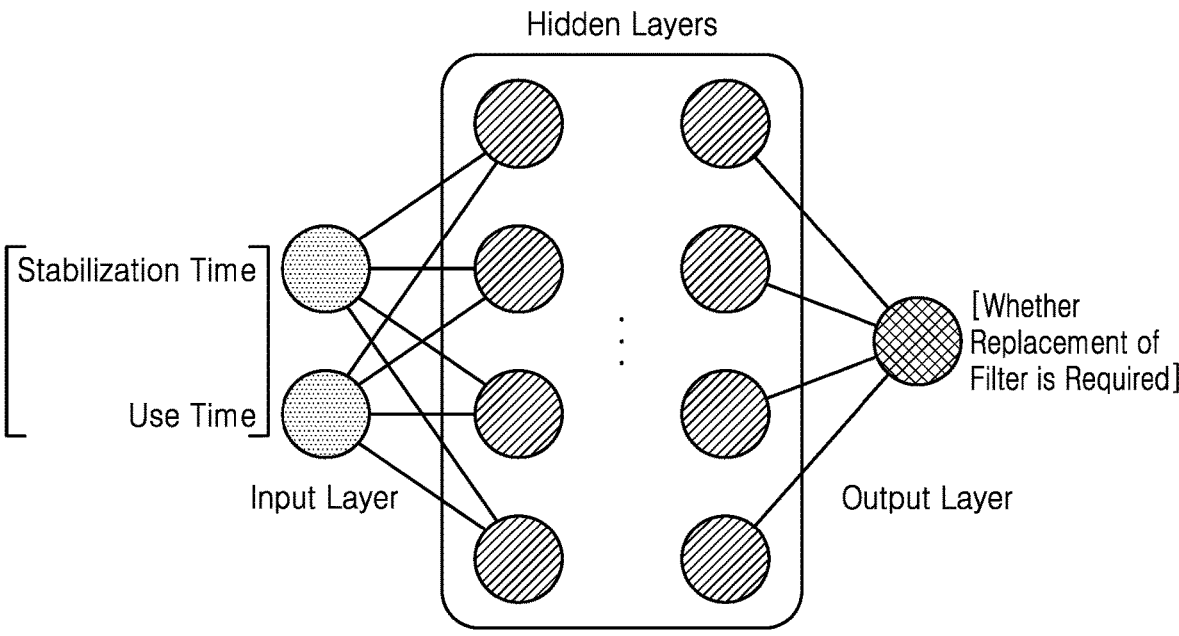
FIG. 8 illustrates a method, performed by an electronic device, of determining whether a replacement of a filter is required, based on an artificial intelligence model, according to an embodiment of the disclosure.

FIG. 8 illustrates a method, performed by the electronic device 1000, of determining whether the replacement of the filter is required, based on an artificial intelligence model, according to an embodiment of the disclosure.

Referring to FIG. 8, the electronic device 1000 according to an embodiment of the disclosure may determine whether the replacement of the filter is required, based on the artificial intelligence model that outputs whether the replacement of the filter is required when the stabilization time and use time are input as input data. In this case, the stabilization time may be a stabilization time calculated when the driving of the fan motor starts, and the use time may be an elapsed time after the fan motor is driven. For example, as shown in FIG. 8, the artificial intelligence model may include hidden layers, an input layer, and an output layer, with stabilization time and use time being input as input data.

Training data of the artificial intelligence model may be obtained by repeating driving and stopping of the electronic device 1000. For example, a stabilization time calculated at the start of $n^{th}$ driving, a total driving time at the $n^{th}$ driving, and a necessity or non-necessity of filter replacement (i.e., whether the replacement of the filter is required) determined at the start of $(n+1)^{th}$ driving may be one training data set. In addition, when the stabilization time at the start of the $n^{th}$ driving and the total driving time at the $n^{th}$ driving are input, the artificial intelligence model may be trained to output the necessity or non-necessity of filter replacement determined at the start of the $(n+1)^{th}$ driving.

In addition, the electronic device 1000 according to an embodiment of the disclosure may determine the necessity or non-necessity of filter replacement based on the artificial intelligence model that outputs the necessity or non-necessity of filter replacement when the stabilization time, the average value of the RPMs of the fan motor, and the use time are input as input data.

In this case, the stabilization time calculated at the start of the $n^{th}$ driving, the average value of the RPMs of the fan motor at the $n^{th}$ driving, the total driving time at the $n^{th}$ driving, and the necessity or non-necessity of filter replacement determined at the start of the $(n+1)^{th}$ driving may be one training data set. In addition, when the stabilization time at the start of the $n^{th}$ driving and the total driving time at the $n^{th}$ driving are input to the artificial intelligence model, the artificial intelligence model may be trained to output the necessity or non-necessity of filter replacement determined at the start of the $(n+1)^{th}$ driving.

According to an embodiment of the disclosure, the artificial intelligence model may be implemented in a server, instead of the electronic device 1000. The electronic device 1000 may transmit the stabilization time and the use time to the server and may receive information about the necessity or non-necessity of filter replacement from the server.

In addition, the artificial intelligence model may be pre-trained before shipment of the electronic device 1000 and implemented in the electronic device 1000 or the server. In addition, the artificial intelligence model may be trained based on the use of the electronic device 1000. For example, the artificial intelligence model may use the stabilization time, the use time, and data regarding the necessity or non-necessity of filter replacement, which are obtained according to the use of the electronic device 1000, as training data of the artificial intelligence model.

Figure 9:
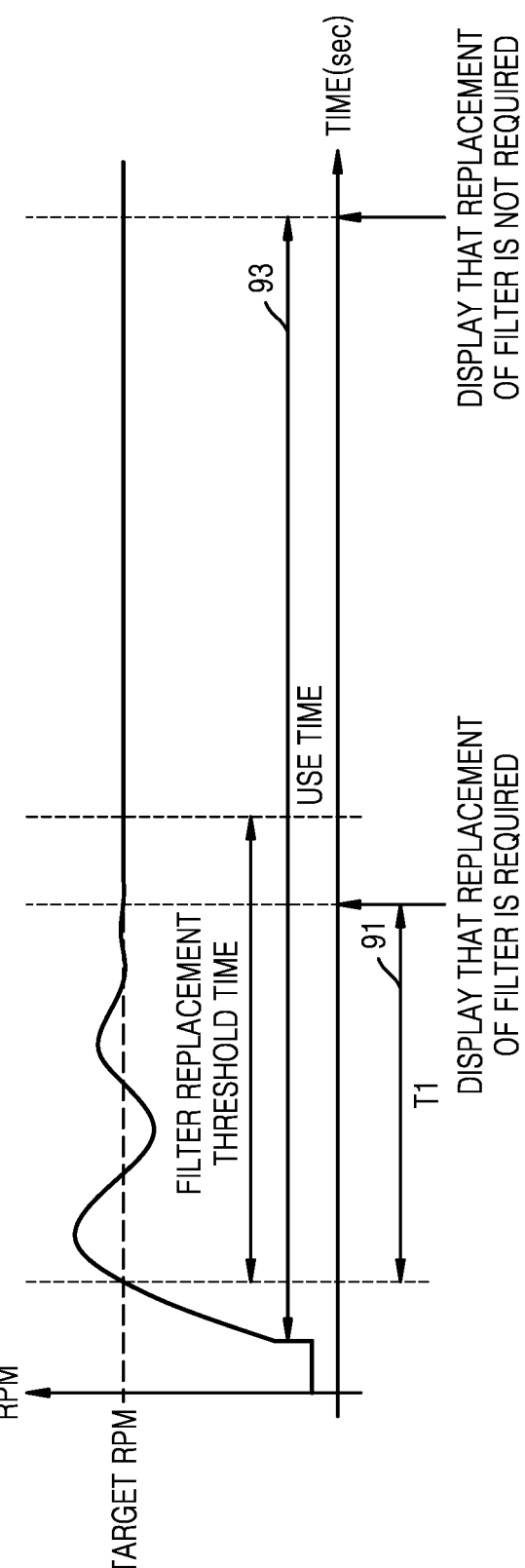
FIG. 9 illustrates a method, performed by an electronic device, of determining whether a replacement of a filter is required during driving of the electronic device, according to an embodiment of the disclosure.

FIG. 9 illustrates a method, performed by the electronic device 1000, of determining whether the replacement of the filter is required during driving, according to an embodiment of the disclosure.

Referring to FIG. 9, even after the electronic device 1000 determines that the replacement of the filter is not required at the start of driving the electronic device 1000, the electronic device 1000 may determine whether the replacement of the filter is required, based on an artificial intelligence model during driving, and may output information about whether the replacement of the filter is required.

As illustrated in FIG. 9, when the driving of the fan motor starts, the electronic device 1000 may calculate a stabilization time 91 and may determine whether the replacement of the filter is required by comparing the calculated stabilization time 91 with a filter replacement threshold time corresponding to a target RPM. When the electronic device 1000 determines that the replacement of the filter is not required, the electronic device 1000 may display that the replacement of the filter is not required.

As the driving of the fan motor continues after the electronic device 1000 determines that the replacement of the filter is not required, the electronic device 1000 may periodically determine whether the replacement of the filter is required, based on an artificial intelligence model during driving. For example, the electronic device 1000 may obtain information about whether the replacement of the filter is required, which is the output value of the artificial intelligence model, by inputting, as the input data of the artificial intelligence model, the stabilization time 91 calculated when the driving of the fan motor starts, the use time 93, which is the time elapsed from the start of the driving, and the average RPM of the fan motor for the use time.

When the output value of the artificial intelligence model indicates that the replacement of the filter is required, the electronic device 1000 may output a notification that the replacement of the filter is required.

Accordingly, the electronic device 1000 may indicate that the replacement of the filter is required when the contamination level of the filter is greater than the reference level during the driving of the electronic device 1000 as well as at the start of driving the electronic device 1000.

Figure 10:
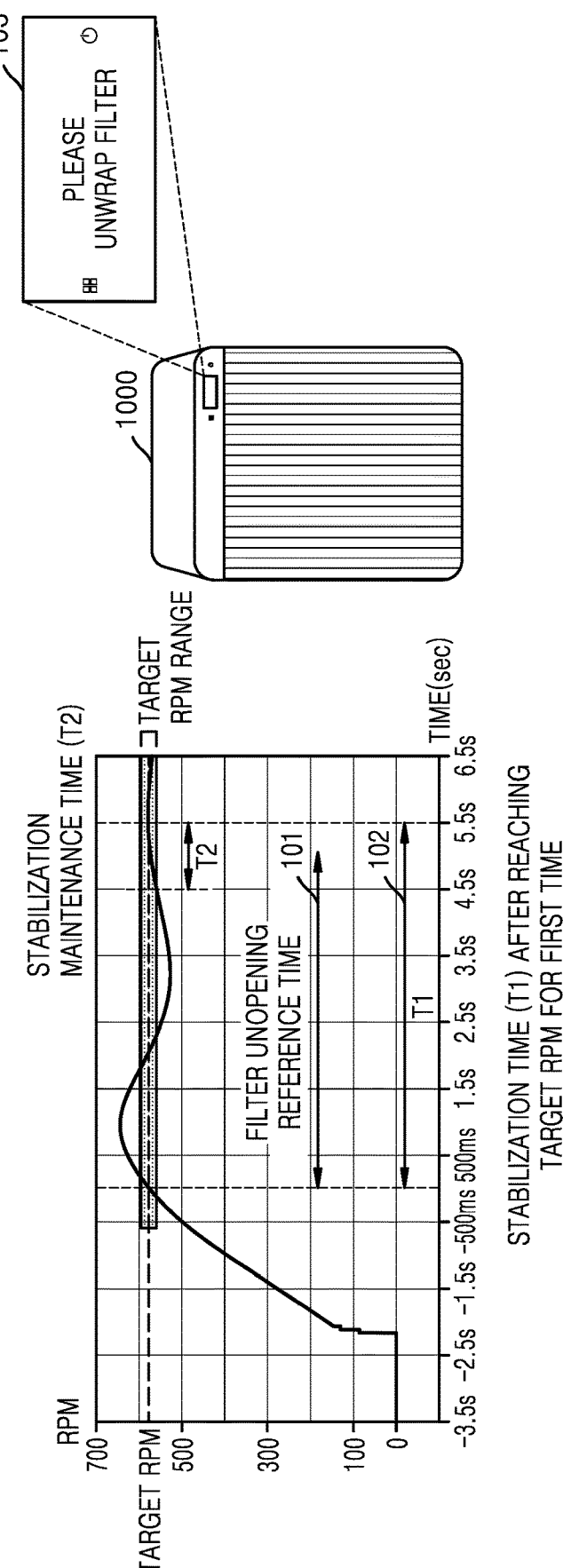
FIG. 10 illustrates a method, performed by an electronic device, of determining whether a filter is unwrapped, based on a stabilization time of a fan motor, according to an embodiment of the disclosure.

FIG. 10 illustrates a method, performed by the electronic device 1000, of determining whether a filter is unwrapped, based on a stabilization time of a fan motor, according to an embodiment of the disclosure.

Referring to FIG. 10, when the RPM of the fan motor exceeds a filter unopening reference time, the electronic device 1000 may determine that the filter is not unwrapped and may output a notification guiding to unwrap the filter.

In general, the electronic device 1000 having a built-in filter is shipped with the filter wrapped in a packaging material, such as vinyl, in order to prevent contamination of the filter when the product is shipped. Accordingly, a case where the user operates the electronic device 1000, without recognizing that the filter is wrapped, frequently occurs even though the user has to drive the electronic device 1000 after unwrapping the filter.

A filter unopening reference time 101 may be prestored in the electronic device 1000. The filter unopening reference time 101 may be a stabilization time of the RPM of the fan motor detected when the fan motor is driven in a state in which the filter is wrapped. In addition, when the filter is in a wrapped state, air does not pass through the filter, and thus, the filter unopening reference time 101 may be much greater than the filter replacement threshold time.

The electronic device 1000 may calculate a stabilization time 102 of the fan motor at the start of the driving, and may determine whether the calculated stabilization time 102 is greater than or equal to the prestored filter unopening reference time 101 by comparing the calculated stabilization time 102 with the prestored filter unopening reference time 101. When the electronic device 1000 determines that the calculated stabilization time 102 is greater than or equal to the prestored filter unopening reference time 101, the electronic device 1000 may determine that the filter is not unwrapped.

When the electronic device 1000 determines that the filter is not unwrapped, the electronic device 1000 may display guide text 103 guiding to unwrap the filter. In addition, when the electronic device 1000 determines that the filter is not unwrapped, the electronic device 1000 may output notification sound guiding to unwrap the filter or may output blinking indicating that the filter is not unwrapped.

Figure 11:
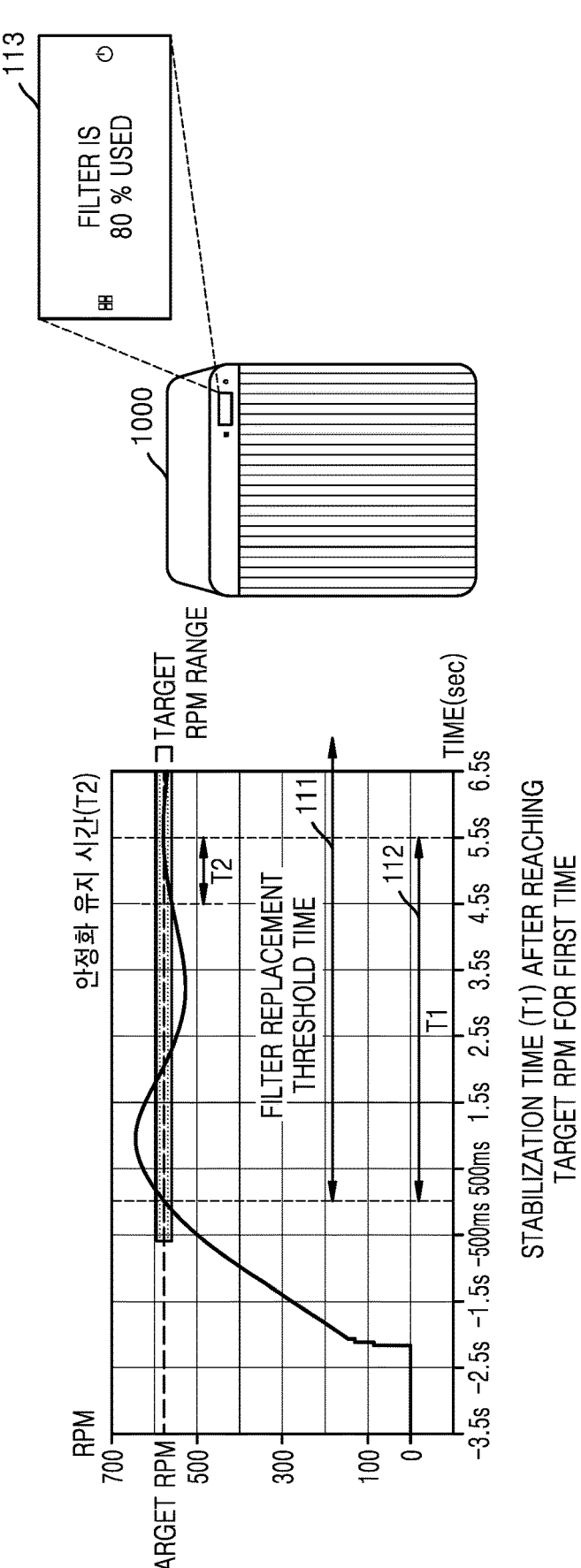
FIG. 11 illustrates a method, performed by an electronic device, of determining a filter contamination level based on a stabilization time, according to an embodiment of the disclosure.

FIG. 11 illustrates a method, performed by the electronic device 1000, of determining the contamination level of the filter based on the stabilization time, according to an embodiment of the disclosure.

Referring to FIG. 11, the electronic device 1000 according to an embodiment of the disclosure may calculate the contamination level of the filter based on a ratio of a stabilization time 112 to a filter replacement threshold time 111.

For example, when the filter replacement threshold time 111 is 1.5 seconds and the stabilization time 112 is 1.2 seconds, the electronic device 1000 may display an image or text indicating that the filter is 80% contaminated.

In addition, the electronic device 1000 according to an embodiment of the disclosure may obtain the contamination level of the filter, based on an artificial intelligence model that outputs the contamination level of the filter when the stabilization time at the start of the driving, the use time after the start of the driving, and the average RPM for the use time are input as input data.

In this case, the stabilization time at the start of the driving, the use time after the start of the driving, the average RPM for the use time, and the contamination level of the filter may be obtained in advance as one training data set, and the artificial intelligence model may be pre-trained to output the corresponding contamination level of the filter when the stabilization time at the start of operation, the use time after the start of operation, and the average RPM for the use time are input as the input data.

When the electronic device 1000 receives a user input of turning on the electronic device 1000, the electronic device 1000 may display information indicating the contamination level of the filter. In addition, when the electronic device 1000 receives a user input of selecting a menu for displaying the contamination level of the filter, the electronic device 1000 may display information indicating the contamination level of the filter.

Figure 12:
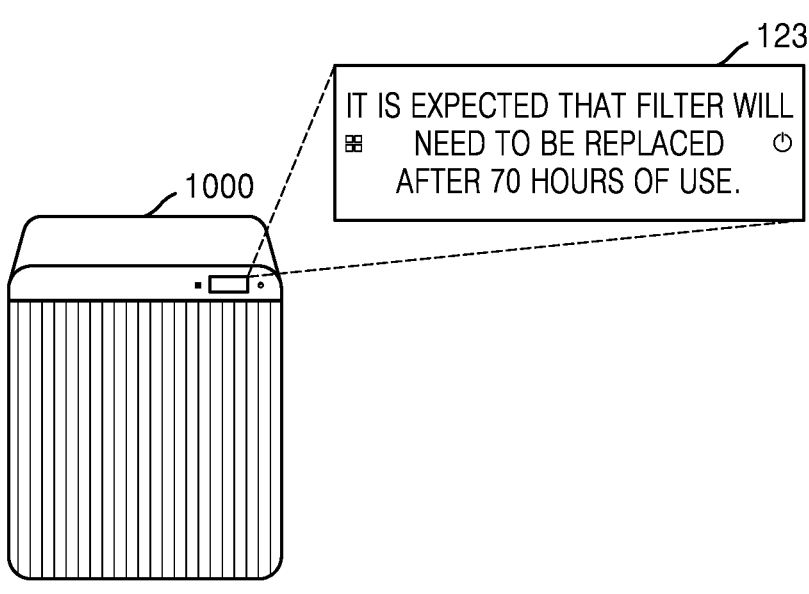
FIG. 12 illustrates a method, performed by an electronic device, of determining an expected filter replacement time based on a stabilization time, according to an embodiment of the disclosure.

FIG. 12 illustrates a method, performed by the electronic device 1000, of determining an expected replacement time of a filter, based on a stabilization time, according to an embodiment of the disclosure.

Referring to FIG. 12, the electronic device 1000 may calculate a contamination rate of a filter based on the stabilization time. In addition, the electronic device 1000 may determine an expected replacement time of a filter based on the calculated contamination rate.

As illustrated in FIG. 11, the electronic device 1000 may determine the contamination level of the filter based on the stabilization time. In addition, the electronic device 1000 may determine the contamination rate of the filter according to the use time and the use RPM, based on the contamination level of the filter determined at the start of $n^{th}$ driving and the contamination level of the filter determined at the start of $(n+1)^{th}$ driving.

For example, the electronic device 1000 may determine the contamination rate of the filter according to the use time and the use RPM, based on a ratio of the product of the average RPM at the $n^{th}$ driving and the use time at the $n^{th}$ driving to the difference between the contamination level of the filter determined at the start of the $(n+1)^{th}$ driving and the contamination level of the filter determined at the start of the $n^{th}$ driving. For example, the electronic device 1000 may divide the difference between the contamination level of the filter determined at the start of the $(n+1)^{th}$ driving and the contamination level of the filter determined at the start of the $n^{th}$ driving by the product of the average RPM at the $n^{th}$ driving and the use time at the $n^{th}$ driving, and may determine a result value as the contamination rate of the filter.

In addition, the electronic device 1000 may calculate an expected replacement time of a filter based on the contamination level of the filter determined at the start of the $(n+1)^{th}$ driving, the determined contamination rate of the filter, and the current RPM. For example, when the contamination level of the filter determined at the start of the $(n+1)^{th}$ driving is 80%, the electronic device 1000 may calculate a usable time until the contamination level reaches 100% when continuously used at the current RPM, based on the contamination rate of the filter and the current RPM. For example, the electronic device 1000 may determine a value obtained by dividing 20 (100%-80%) by the contamination rate of the filter and the current RPM, as the usable time until the contamination level reaches 100% when continuously used at the current RPM.

The electronic device 1000 may determine the usable time until the contamination level reaches 100% as the time expected to require the replacement of the filter, and may display an image or text indicating the time expected to require the replacement of the filter. For example, as illustrated in FIG. 12, the electronic device 1000 may display text 123 "It is expected that the filter will need to be replaced after 70 hours of use."

In addition, as described above with reference to FIG. 11, the electronic device 1000 may obtain the current contamination level of the filter from the artificial intelligence model by inputting the stabilization time at the start of the driving, the use time after the start of the driving, and the average RPM for the use time as the input data of the artificial intelligence model. In addition, the electronic device 1000 may calculate the expected replacement time of the filter, based on the current contamination level of the filter, the contamination rate of the filter, and the current RPM, at any time during use other than at the start of the driving.

When the electronic device 1000 receives a user input of turning on power, the electronic device 1000 may display the expected replacement time of the filter. In addition, when the electronic device 1000 receives a user input of changing the RPM of the fan motor, the electronic device 1000 may calculate the expected replacement time of the filter based on the current contamination level of the filter and the changed RPM, and may display the calculated expected replacement time of the filter. In addition, when the electronic device 1000 receives a user input of selecting a menu for the expected replacement time of the filter, the electronic device 1000 may calculate the expected replacement time of the filter based on the current contamination level of the filter and the current RPM, and may display the calculated expected replacement time of the filter.

Figure 13:
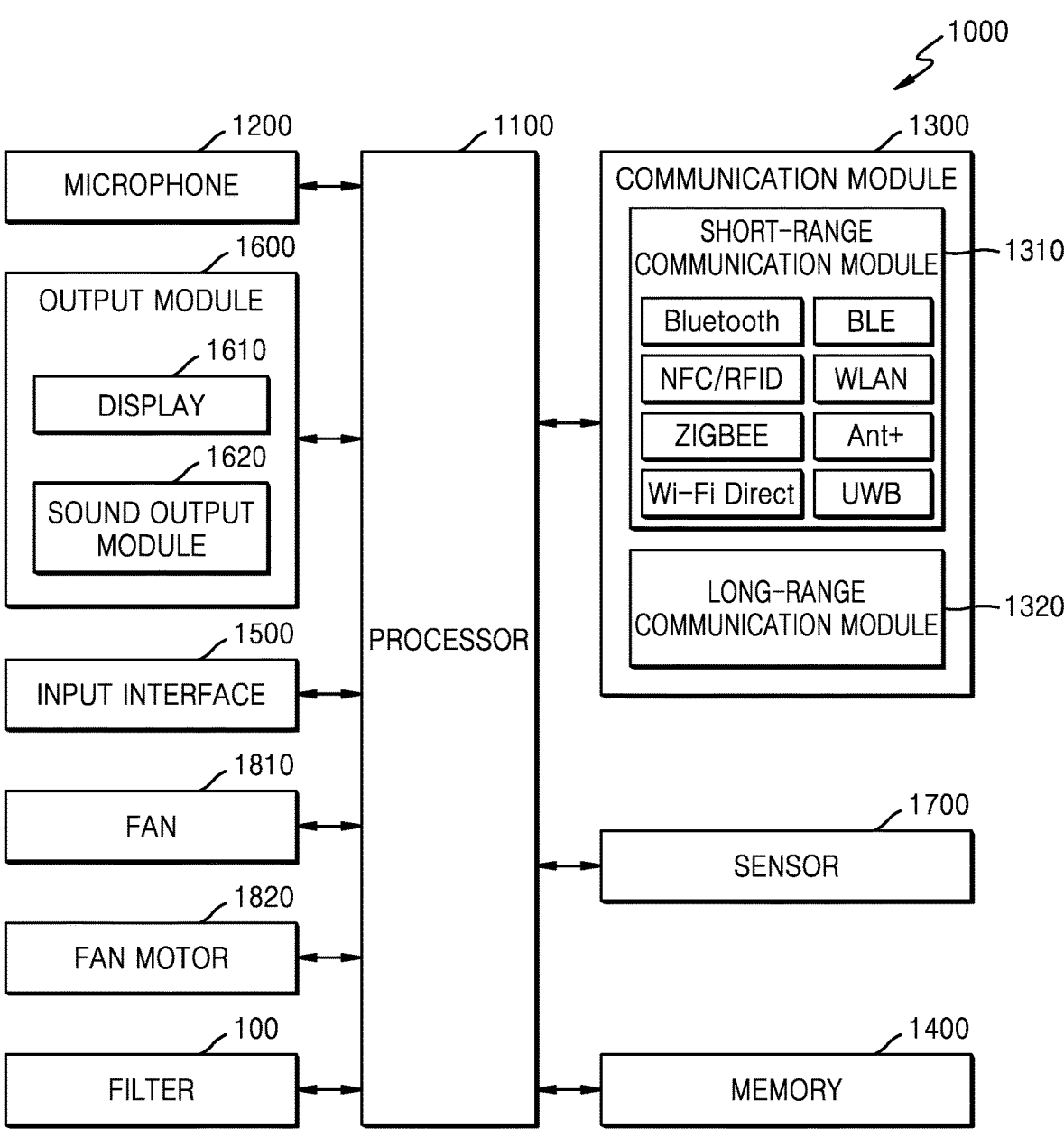
FIG. 13 illustrates a block diagram of an electronic device according to an embodiment of the disclosure.

FIG. 13 illustrates a block diagram of an electronic device 1000 according to an embodiment of the disclosure.

Referring to FIG. 13, the electronic device 1000 may include a processor 1100, a microphone 1200, a communication module 1300, a memory 1400, a sensor 1700, an output module 1600, an input interface 1500, a fan 1810, a fan motor 1820, and a filter 100.

However, not all elements illustrated in FIG. 13 are essential elements of the electronic device 1000. The electronic device 1000 may be implemented with more elements than the elements illustrated in FIG. 13 or may be implemented with fewer elements than the elements illustrated in FIG. 13. For example, the electronic device 1000 may be implemented with the processor 1100, the memory 1400, the input interface 1500, the output module 1600, the fan 1810, and the fan motor 1820.

The processor 1100 may control the overall operation of the electronic device 1000. The processor 1100 may execute a program stored in the memory 1400 to control the elements of the electronic device 1000.

The processor 1100 may include a separate neural processing unit (NPU) that performs an operation of a machine learning model. In addition, the processor 1100 may include a central processing unit (CPU), a graphics processing unit (GPU), and the like.

According to an embodiment of the disclosure, the processor 1100 may include a hardware structure (e.g., an NPU) specialized for processing an artificial intelligence model. The artificial intelligence model may be generated through machine learning. For example, such learning may be performed in the electronic device 1000 itself in which the artificial intelligence model is executed, or may be performed through a separate server (not shown).

A learning algorithm may include, for example, supervised learning, unsupervised learning, semi-supervised learning, or reinforcement learning, but the disclosure is not limited to the above example. The artificial intelligence model may additionally or alternatively include a software structure in addition to the hardware structure.

The microphone 1200 may receive a voice command or a voice request of a user. Accordingly, the processor 1100 may perform control so that an operation corresponding to the voice command or the voice request is performed. In addition, the microphone 1200 may receive a sound around the electronic device 1000.

The communication module 1300 may transmit and receive information to and from an external device (not shown) or a server (not shown) according to a protocol under the control of the processor 1100. The communication module 1300 may include at least one port and at least one communication module configured to transmit and receive data to and from the external device (not shown) or the server (not shown).

In addition, the communication module 1300 may communicate with the external device (not shown) through at least one wired or wireless communication network. The communication module 1300 may include at least one of a short-range communication module 1310 or a long-range communication module 1320, or a combination thereof. The communication module 1300 may include at least one antenna that wirelessly communicates with other devices.

The short-range communication module 1310 may include at least one communication module (not shown) that performs communication in accordance with a communication standard, such as Bluetooth, Wireless Fidelity (Wi-Fi), Bluetooth Low Energy (BLE), Near Field Communication/Radio Frequency Identification (NFC/RFID), Wi-Fi Direct, Ultra-Wideband (UWB), or ZigBee. In addition, the long-range communication module 1320 may include a communication module (not shown) that performs communication through an Internet communication network. In addition, the long-range communication module 1320 may include a mobile communication module (not shown) that performs communication in accordance with a $3^{rd}$ generation (3G), $4^{th}$ generation (4G), $5^{th}$ generation (5G), and/or $6^{th}$ generation (6G) communication standard.

In addition, the communication module 1300 may include a communication module, for example, an infrared (IR) communication module, which is capable of receiving a control command from a remote controller (not shown) located in a short distance.

The memory 1400 may store a variety of information, data, instructions, programs, and the like, which are necessary for the operation of the electronic device 1000. The memory 1400 may include at least one of volatile memory or non-volatile memory, or a combination thereof. The memory 1400 may include, for example, at least one type of storage medium selected from flash memory-type memory, hard disk-type memory, multimedia card micro-type memory, card-type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disc, and optical disc. In addition, the electronic device 1000 may operate a web storage (not shown) or a cloud server (not shown) that performs a storage function on the Internet.

The sensor 1700 may include a sensor that detects information about the surrounding environment of the electronic device 1000. For example, the sensor 1700 may include a dust sensor (not shown), an odor sensor (not shown), a temperature sensor (not shown), a humidity sensor (not shown), an illumination sensor (not shown), and an atmospheric pressure sensor (not shown), but the disclosure is not limited thereto. The dust sensor (not shown) may detect the concentration of at least one of fine dust or ultra-fine dust in the air. The odor sensor (not shown) may detect the concentration of odor particles, such as food, perfume, fragrance, and cosmetics.

The output module 1600 may include a display 1610 and a sound output module 1620, but the disclosure is not limited thereto.

The display 1610 may output image data processed by an image processor (not shown) through a display panel (not shown) under the control of the processor 1100. The display panel (not shown) may include at least one of a liquid crystal display, a thin-film transistor-liquid crystal display, an organic light-emitting diode, a flexible display, a 3D display, or an electrophoretic display.

The sound output module 1620 may output a sound signal to the outside of the electronic device 1000. The sound output module 1620 may include, for example, a speaker or a receiver. The speaker may be used for general purposes, such as multimedia reproduction or recording reproduction.

The input interface 1500 may receive a user input for controlling the electronic device 1000. The input interface 1500 may include a key (not shown), a touch screen (not shown), and the like. The input interface 1500 may receive the user input and transmit the received user input to the processor 1100.

The input interface 1500 may include a user input device including a touch panel that detects a user's touch, a button that receives a user's push operation, a wheel that receives a user's rotating operation, a key board, and a dome switch, but the disclosure is not limited thereto.

In addition, the input interface 1500 may include a motion detection sensor (not shown). For example, the motion detection sensor (not shown) may detect the motion of the electronic device 1000 and receive the detected motion as the user input.

The fan 1810 may be a mechanism having rotary blades around a rotational shaft. The fan motor 1820 may be connected to the rotational shaft of the fan 1810 and may rotate the fan 1810. When the fan motor 1820 rotates, the fan 1810 connected to the fan motor 1820 may rotate. Due to the rotation of the fan 1810, external air may be suctioned into the electronic device 1000. In addition, the suctioned external air may pass through the filter inside the electronic device 1000 and may discharge to the outside again, and contaminants in the external air may be filtered by the filter.

The filter 100 may be detachable from or attachable to the electronic device 1000. The filter 100 may be reused after cleaning, and may be replaced as a consumable item of the electronic device 1000. The filter may include a pre-filter, an antibacterial filter, a deodorizing filter, and a HEPA filter, but the disclosure is not limited thereto. The pre-filter may filter out large dust, such as hair and animal fur. The antibacterial filter may filter out small dust, such as fine dust and mold. The deodorizing filter may filter out odors and harmful gases. The HEPA filter may filter out ultrafine dust, cigarette smoke, and viruses.

When the RPM of the fan motor 1820 increases after the driving of the electronic device 1000 and exceeds the target RPM, the processor 1100 may detect a stabilization time from a time point when the RPM of the fan motor 1820 reaches the target RPM to a time point when the RPM of the fan motor 1820 is maintained within the reference RPM difference with respect to the target RPM.

In addition, when the processor 1100 determines that the detected stabilization time is greater than the filter replacement threshold time, the processor 1100 may display a notification to replace the filter 100 on the display 1610.

In addition, the processor 1100 may detect, as the stabilization time, the time from a time point when the RPM of the fan motor 1820 reaches the target RPM to a time point when the RPM of the fan motor 1820 is maintained for the stabilization maintenance time within the reference RPM difference with respect to the target RPM.

In addition, the processor 1100 1000 may obtain the filter replacement threshold time corresponding to an air volume level set in the electronic device 1000.

In addition, the processor 1100 may perform feedback control on the fan motor 1820 so that the RPM of the fan motor 1820 is maintained within the reference RPM difference with respect to the target RPM as the RPM of the fan motor 1820 exceeds the target RPM.

In addition, the processor 1100 may perform feed-forward control on the fan motor 1820 until the RPM of the fan motor 1820 reaches the target RPM, so that the stabilization time due to the overshoot of the RPM of the fan motor 1820 is greater than or equal to the filter replacement threshold time when the contamination level of the filter 100 is greater than or equal to the required filter replacement level.

In addition, the processor 1100 may determine whether the replacement of the filter 100 is required, based on an artificial intelligence model that outputs whether the replacement of the filter 100 is required when the detected stabilization time and the use time after the detection of the stabilization time are input as input data.

In addition, after the electronic device 1000 determines that it is not time to replace the filter 100, based on the detected stabilization time, the electronic device 1000 may display a notification to replace the filter 100 when the electronic device 1000 determines that the replacement of the filter 100 is required, based on the output value of the artificial intelligence model during the driving of the electronic device 1000.

In addition, when the electronic device 1000 determines that the detected stabilization time is greater than or equal to the filter unopening reference time, the processor 1100 may output a notification guiding to unwrap the filter 100.

In addition, the processor 1100 may determine the contamination level of the filter 100 based on the detected stabilization time and may display contamination information indicating the determined contamination level.

In addition, the processor 1100 may calculate the expected replacement time of the filter 100, based on the determined contamination level of the filter 100, and may display the calculated expected replacement time.

The term "module" or "interface" as used in various embodiments of the disclosure may include a unit implemented in hardware, software, or firmware and may be used interchangeably with, for example, "logics," "logic blocks," "components," or "circuits." The module may be an integrally constructed component or a minimal unit of the component or a portion thereof that performs one or more functions. For example, according to an embodiment of the disclosure, the module may be implemented in the form of an application-specific integrated circuit (ASIC).

A machine-readable storage medium may be provided in the form of a non-transitory storage medium. The "non-transitory storage medium" is a tangible device and only means not including a signal (e.g., electromagnetic wave). This term does not distinguish between a case where data is semi-permanently stored in a storage medium and a case where data is temporarily stored in a storage medium. For example, the non-transitory computer-readable recording medium may include a buffer in which data is temporarily stored.

According to an embodiment of the disclosure, the methods according to various embodiments of the disclosure may be provided by being included in a computer program product. The computer program products may be traded between a seller and a buyer as commodities. The computer program product may be distributed in the form of a machine-readable storage medium (e.g., CD-ROM), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The invention claimed is:

1. An electronic device comprising:
a fan that is rotatable to suction air through a filter;
a fan motor configured to rotate the fan;
at least one memory storing one or more instructions; and
at least one processor configured to execute the one or more instructions stored in the at least one memory to:
when a revolutions per minute (RPM) of the fan motor increases while rotating the fan so as to exceed a target RPM, detect a stabilization time from a time point when the RPM of the fan motor reaches the target RPM to a time point when the RPM of the fan motor is maintained within a reference RPM difference with respect to the target RPM,
determine whether the detected stabilization time is greater than a filter replacement threshold time, and
when it is determined that the detected stabilization time is greater than the filter replacement threshold time, perform control so that a notification to replace the filter is displayed on a display.

2. The electronic device of claim 1, wherein the at least one processor is further configured to execute the one or more instructions stored in the at least one memory to:
detect, as the stabilization time, a time from the time point when the RPM of the fan motor reaches the target RPM to the time point when the RPM of the fan motor is maintained within the reference RPM difference with respect to the target RPM for a stabilization maintenance time.

3. The electronic device of claim 1, wherein the filter replacement threshold time is based on an air volume level set in the electronic device.

4. The electronic device of claim 1, wherein the at least one processor is further configured to execute the one or more instructions stored in the at least one memory to:
when the RPM of the fan motor exceeds the target RPM, perform feedback control on the fan motor so that the RPM of the fan motor is maintained within the reference RPM difference with respect to the target RPM.

5. The electronic device of claim 1, wherein the at least one processor is further configured to execute the one or more instructions stored in the at least one memory to:
when a contamination level of the filter is greater than or equal to a level at which filter replacement is required, perform feed-forward control on the fan motor until the RPM of the fan motor reaches the target RPM, so that the stabilization time due to an overshoot of the RPM of the fan motor is greater than or equal to the filter replacement threshold time.

6. The electronic device of claim 1, wherein the at least one processor is further configured to execute the one or more instructions stored in the at least one memory to:
determine whether filter replacement is required, based on an artificial intelligence model that outputs whether the filter replacement is required when the detected stabilization time and a use time after the stabilization time is detected are input as input data to the artificial intelligence model.

7. The electronic device of claim 1, wherein the at least one processor is further configured to execute the one or more instructions stored in the at least one memory to:
when it is determined that the detected stabilization time is not greater than the filter replacement threshold time, determine whether filter replacement is required based on an artificial intelligence model that outputs whether the filter replacement is required when the detected stabilization time and a use time after the stabilization time is detected are input as input data to the artificial intelligence model, and
when it is determined that filter replacement is required based on the artificial intelligence model, perform control to display a notification to replace the filter.

8. The electronic device of claim 1, wherein the at least one processor is further configured to execute the one or more instructions stored in the at least one memory to:
determine whether the detected stabilization time is greater than or equal to a filter unopening reference time,
when it is determined that the detected stabilization time is greater than or equal to a filter unopening reference time, perform control to output a notification guiding to unwrap the filter.

9. The electronic device of claim 1, wherein the at least one processor is further configured to execute the one or more instructions stored in the at least one memory to:
determine a contamination level of the filter based on the detected stabilization time, and

25 perform control to display contamination information indicating the determined contamination level.

10. The electronic device of claim 9, wherein the at least one processor is further configured to execute the one or more instructions stored in the at least one memory to:
 calculate an expected replacement time of the filter based on the determined contamination level of the filter, and
 perform control to display the calculated expected replacement time.

11. A method of controlling an electronic device that includes a fan that is rotatable to suction air through a filter, and a fan motor configured to rotate the fan, the method comprising:
 when a revolutions per minute (RPM) of the fan motor increases while rotating the fan so as to exceed a target RPM, detecting a stabilization time from a time point when the RPM of the fan motor reaches the target RPM to a time point when the RPM of the fan motor is maintained within a reference RPM difference with respect to the target RPM;
 determining whether the detected stabilization time is greater than a filter replacement threshold time; and
 when it is determined that the detected stabilization time is greater than the filter replacement threshold time, performing control so that a notification to replace the filter is displayed.

12. The method of claim 11, wherein the detecting of the stabilization time from the time point when the RPM of the fan motor reaches the target RPM to the time point when the RPM of the fan motor is maintained within the reference RPM difference with respect to the target RPM comprises detecting, as the stabilization time, a time from the time point when the RPM of the fan motor reaches the target RPM to the time point when the RPM of the fan motor is maintained within the reference RPM difference with respect to the target RPM for a stabilization maintenance time.

13. The method of claim 11, wherein the filter replacement threshold time is based on an air volume level set in the electronic device.

14. The method of claim 11, further comprising:
 when the RPM of the fan motor exceeds the target RPM, performing feedback control on the fan motor so that the RPM of the fan motor is maintained within the reference RPM difference with respect to the target RPM.

15. The method of claim 11, further comprising:
 when a contamination level of the filter is greater than or equal to a level at which filter replacement is required, performing feed-forward control on the fan motor until the RPM of the fan motor reaches the target RPM, so that the stabilization time due to an overshoot of the RPM of the fan motor is greater than or equal to the filter replacement threshold time.

16. The method of claim 11, further comprising:
 determining whether filter replacement is required, based on an artificial intelligence model that outputs whether the filter replacement is required when the detected stabilization time and a use time after the stabilization time is detected are input as input data to the artificial intelligence model.

17. The method of claim 11, further comprising:
 when it is determined that the detected stabilization time is not greater than the filter replacement threshold time, determining whether filter replacement is required based on an artificial intelligence model that outputs whether the filter replacement is required when the detected stabilization time and a use time after the stabilization time is detected are input as input data to the artificial intelligence model; and
 when it is determined that filter replacement is required based on the artificial intelligence model, performing control to displaying a notification to replace the filter.

18. The method of claim 11, further comprising:
 determining whether the detected stabilization time is greater than or equal to a filter unopening reference time; and
 when it is determined that the detected stabilization time is greater than or equal to the filter unopening reference time, performing control to output a notification guiding to unwrap the filter.

19. The method of claim 11, further comprising:
 determining a contamination level of the filter based on the detected stabilization time; and
 performing control to display contamination information indicating the determined contamination level.

20. A non-transitory computer-readable recording medium having recorded thereon a computer program for causing a computer to perform the method of claim 11.

* * * * *